US012361362B2

(12) United States Patent
Reed

(10) Patent No.: US 12,361,362 B2
(45) Date of Patent: Jul. 15, 2025

(54) METHOD AND SYSTEM FOR ACQUIRING, TRACKING, AND TESTING SAMPLE DATA

(71) Applicant: Scott D. Reed, Wheeling, WV (US)

(72) Inventor: Scott D. Reed, Wheeling, WV (US)

( * ) Notice: Subject to any disclaimer, the term of this patent is extended or adjusted under 35 U.S.C. 154(b) by 455 days.

(21) Appl. No.: 17/688,185

(22) Filed: Mar. 7, 2022

(65) Prior Publication Data

US 2022/0188735 A1    Jun. 16, 2022

Related U.S. Application Data

(63) Continuation-in-part of application No. 16/698,416, filed on Nov. 27, 2019, now Pat. No. 11,269,883.

(51) Int. Cl.
G06Q 10/0639    (2023.01)
G07C 3/00    (2006.01)
G07C 5/08    (2006.01)

(52) U.S. Cl.
CPC ......... G06Q 10/06395 (2013.01); G07C 3/00 (2013.01); G07C 5/08 (2013.01)

(58) Field of Classification Search
CPC ............. G06Q 10/06395; G06Q 10/20; G06Q 10/087; G07C 3/00; G07C 5/08; G06V 20/10; G06V 30/10
See application file for complete search history.

(56) References Cited

U.S. PATENT DOCUMENTS 8,397,128 B1    3/2013    Alonzo et al.
8,600,932 B2    12/2013    Poling et al.
10,409,553 B2    9/2019    Mody et al.
2002/0198858 A1*    12/2002    Stanley ................... G06F 16/20
                                                                706/50

(Continued)

FOREIGN PATENT DOCUMENTS

CN    110378446    2/2020
EP    1862807    8/2010

(Continued)

OTHER PUBLICATIONS

Waldo ("Methods of Testing Transformer Oil", University of Illinois, Thesis, 1913) (Year: 1913).

(Continued)

*Primary Examiner* — Lisa M Caputo
*Assistant Examiner* — Cynthia L Davis
(74) *Attorney, Agent, or Firm* — Hawley Troxell; Rivkah Young

(57) ABSTRACT

Asset data is collected from one or more managers and stored in a known asset database. The known asset database enables tracking and maintenance of assets associated with each manager. One or more technicians may also be associated with assets in the known asset database. A technician is provided with access to a sample collection application on a computing system, which allows the technician to provide data associated with physical or other types of samples. Sample data is then correlated with asset data. Once a sample has been correlated with an asset, a technician or other party is presented with an interface through a sample collection application, allowing the party to place one or more requests for tests to be performed on one or more samples. Once the one or more tests are performed, test results data is provided.

30 Claims, 15 Drawing Sheets

(56) References Cited

U.S. PATENT DOCUMENTS

| | | | |
|---|---|---|---|
| 2003/0144981 A1* | 7/2003 | Schrof | G16B 50/00 |
| 2005/0222933 A1 | 10/2005 | Wesby | |
| 2006/0200391 A1* | 9/2006 | Taylor | G16H 40/20 705/28 |
| 2010/0127067 A1* | 5/2010 | Eisenberg | G16H 10/40 235/375 |
| 2012/0069131 A1 | 3/2012 | Abelow | |
| 2013/0073473 A1 | 3/2013 | Heath | |
| 2014/0207862 A1 | 7/2014 | Domke et al. | |
| 2015/0066782 A1 | 3/2015 | Vainberg et al. | |
| 2015/0088434 A1 | 3/2015 | Grabau et al. | |
| 2015/0186809 A1 | 7/2015 | Hawaldar et al. | |
| 2015/0242286 A1 | 8/2015 | Grewal | |
| 2015/0242592 A1* | 8/2015 | Weiss | G16H 10/60 705/2 |
| 2015/0262120 A1* | 9/2015 | Kulig | G06Q 30/0639 705/28 |
| 2015/0278219 A1 | 10/2015 | Phipps | |
| 2015/0287318 A1 | 10/2015 | Nair et al. | |
| 2016/0379134 A1 | 12/2016 | Kochut et al. | |
| 2017/0058645 A1 | 3/2017 | Hunter | |
| 2017/0098268 A1 | 4/2017 | Karvela et al. | |
| 2017/0192414 A1 | 7/2017 | Mukkamala et al. | |
| 2017/0199967 A1* | 7/2017 | De La Torre-Bueno | G16B 50/00 |
| 2017/0318166 A1* | 11/2017 | Wall Warner | H04L 9/40 |
| 2018/0322590 A1 | 11/2018 | Sundararajan et al. | |
| 2019/0101898 A1 | 4/2019 | Middendorf et al. | |
| 2019/0213061 A1 | 7/2019 | Campos et al. | |
| 2019/0294990 A1 | 9/2019 | Lopez de Prado | |
| 2019/0297055 A1 | 9/2019 | May et al. | |
| 2019/0303450 A1* | 10/2019 | Richards | G06F 16/3331 |
| 2020/0183811 A1 | 6/2020 | Krishnan et al. | |
| 2020/0184419 A1* | 6/2020 | Watling | G06F 16/953 |

FOREIGN PATENT DOCUMENTS

| | | |
|---|---|---|
| JP | 2016/511865 | 4/2016 |
| KR | 10-2022496 | 8/2011 |
| WO | WO 2011/014912 | 2/2011 |

OTHER PUBLICATIONS

Gill (Electrical power equipment maintenance and testing. New York, NY [u.a.]: Dekker. ISBN 9780824799076, 1998) (Year: 1998).

Wikipedia ("Transformer oil testing." Wikipedia, The Free Encyclopedia. Wikipedia, The Free Encyclopedia, Oct. 14, 2019) (Year: 2019).

* cited by examiner

FIG. 8A

800 Create Your Asset
802

- Serial Number: X93521
- Company: MVA Diagnostics, In
- Substation Location: Front St. Sub
- Unit ID:
- Status: In Service
- Equipment: Transformer

- Status: In Service
- Equipment Type: Transformer — 804
- Manufacturer: ---None--- 
  802

806

Transformer
Oil Circuit Breaker
Voltage Regulator
Furnace Transformer
Network Transformer
Current or Potential Transformer Done

800
- KVA Rating: 12000
- Gals: 3245
- Fluid Type: Natural Ester
- Phases: 3
- Breather Configuration: Sealed

SAVE — 816

800
- Gals: [ ]
- Fluid Type: Mineral Oil
- Phases: 3
- Breather Configuration: ---Not Reported--- — 813

SAVE

802

815 — ---Not Reported---
Sealed
Free Breather
Conservator
Free Breather with Desiccant Done

FIG. 9C

METHOD AND SYSTEM FOR ACQUIRING, TRACKING, AND TESTING SAMPLE DATA

RELATED APPLICATIONS

This application claims priority to U.S. application Ser. No. 16/698,416, filed in the name of Scott D. Reed on Nov. 27, 2019, entitled "METHOD AND SYSTEM FOR ACQUIRING, TRACKING, AND TESTING ASSET SAMPLE DATA," which is hereby incorporated by reference in its entirety as if it were fully set forth herein.

This application is related to U.S. patent application Ser. No. 17/687,921, naming Scott D. Reed as inventor, filed concurrently with the present application on Mar. 7, 2022, entitled "METHOD AND SYSTEM FOR ACQUIRING, TRACKING, AND TESTING ASSET SAMPLE DATA," which is hereby incorporated by reference in its entirety as if it were fully set forth herein.

BACKGROUND

Numerous types of mechanical, electrical, and/or electronic devices, machinery and equipment are utilized daily for a vast array of personal, residential, commercial, and industrial applications. For example, equipment such as transformers, generators, and voltage regulators play crucial roles in the distribution of electricity and power to billions of people worldwide. In addition to the value provided as a result of the functions they perform, this equipment is also often of significant value in and of itself. As such, it is very important to ensure that these valuable assets are safely and effectively functioning at all times. To this end, periodic inspection, testing, and maintenance is routinely performed on these assets. In many fields of endeavor, inspecting, testing and maintaining these assets requires collection of physical or other types of samples from the assets. For example, in the case of an oil-filled transformer, a physical sample of the transformer oil may be collected, and then a variety of tests can be performed on the sample to determine whether the transformer is operating safely, effectively, and efficiently. Additionally, if the transformer has been deemed unsafe, then environmental testing may be performed on the sample to determine hazardous waste characterizations.

Tests such as these are traditionally performed by technicians and other specialists, who may perform inspections on on-site assets and/or collect physical or other types of samples from on-site assets, or may travel to physical locations of one or more assets in order to inspect the assets and/or collect inspection reports and/or samples from those assets. Inspection report data may include data such as, but not limited to, liquid level, temperature readings, and data associated with leakage. In some cases, samples and/or inspection reports may be collected from one or more storage containers or other types of vessels, which may be physically part of the asset, or may be associated with one or more assets and/or manufacturing processes. As one illustrative example, fluids, spent materials and/or byproducts resulting from a manufacturing process may be stored in multiple containers and then pumped into one common container, from which samples may be collected for testing. Herein, these technicians and other specialists are collectively referred to as "technicians." Once inspections are performed and/or one or more samples are collected, inspection report data may be logged and tracked alongside or in conjunction with data related to the collected samples. Information associated with an asset and information associated with samples collected from the asset may include information such as, but not limited to, inspection report data, serial number, location of the asset, unit ID, status, equipment type, manufacturer, fluid type, etc.

In order to inspect an asset and collect and process physical samples, a technician needs to be at the physical location of the container requiring sampling, and manually transfer any inspection data, serial number, model type, unit ID, unit location, or other identifying data associated with the asset, container, vessel, and/or physical sample into a log book, form, or other record-keeping tool. Unfortunately, manual entry of asset and sample data often creates a significant burden on the individual tasked with this job, and frequently results in data entry errors that could otherwise be avoided.

For example, assets may be located in a wide variety of locations, some of which may be subject to unfavorable geographical and/or weather conditions. While some assets may be located indoors, on-site, for example, in a factory, plant, or other industrial facility, other assets may be delivered to a testing site or may be located in remote locations which expose the assets to dirt, mud, dust, or debris, which often makes proper identification of the assets a problematic task. Some assets may be located in difficult or hard to reach places, for example, in basements of industrial facilities such as steel mills, or outdoors in rural areas on top of wind turbines. Therefore, servicing an asset may require the use of specialized equipment or vehicles such as bucket trucks. Further, a technician may need to contend with any possible weather conditions such as rain, wind, snow, or extreme heat/cold. Therefore, manually correlating the asset and sample data under varying conditions is often difficult and time-consuming, and may result in a variety of issues, such as lost records, correlating the inspection and sample data to the wrong asset, running the wrong tests, or running unnecessary tests instead of the correct and necessary tests. Further, complications such as these may require a technician to return to the asset site to obtain the correct data, and therefore valuable time, energy, and money may be wasted.

Additionally, in order to perform analysis on a physical or other type of sample, large quantities of asset and sample data must be obtained to ensure that the assets and samples conform to industry standards. Traditionally, these large quantities of data are recorded manually every time an asset is inspected and sampled. Typically, assets are inspected and sampled yearly, at a minimum, and if any data entry errors are discovered during the inspection, sampling, and testing process, alternative approaches must be taken to confirm which asset was actually inspected, sampled, and tested.

What is needed, therefore, is a method and system to efficiently acquire data associated with assets and samples collected either on-site or in the field and to accurately and reliably correlate the collected data with the correct assets and test requests to ensure that the assets continue to operate safely and effectively. Utilizing the embodiments disclosed herein, the correct asset is efficiently, accurately, and reliably identified and correlated with the corresponding sample data, which offers tremendous value to any manager responsible for the retrieval and testing of sample data.

SUMMARY

Embodiments of the present disclosure provide an effective and efficient technical solution to the technical problem of maintaining asset functionality through the acquisition, tracking, and testing of sample data. In various embodiments, one or more managers of one or more assets are provided with access to a database management application.

Asset data is then obtained for one or more assets associated with the one or more managers through the database management application. In one embodiment, the asset data is stored as known asset data in a known asset database, which is accessible through the database management application. As used herein, the term "manager" may refer to an owner of one or more assets, a manager of one or more assets, a decision-maker responsible for assessing the status of an asset after receiving sample test results, a technician responsible for servicing one or more assets, and/or any asset service provider. In one embodiment, the asset data associated with one or more of a manager's assets is initially provided directly by the manager through the database management application, which may be a desktop or mobile computing system application. In various other embodiments, the asset data may initially be collected from one or more third party sources.

In one embodiment, the known asset database enables one or more managers to be associated with one or more assets, thereby allowing each of the managers to track and maintain those assets. In one embodiment, a single manager is associated with one or more assets, however, in other embodiments, multiple managers may be associated with a single asset. For example, one asset may be associated with an owner of the asset, as well as several technicians.

In some embodiments, once one or more managers have been associated with one or more assets, one or more technicians are provided with a user interface to a sample collection application. In one embodiment, the sample collection application allows the technician to collect and provide data associated with assets and samples through a computing system associated with the technician. Typically, sample data is collected on-site or in the field by a technician, however in some embodiments, sample data may be collected by an owner, a manager, or other service provider. As used herein, the term "technician" is used to describe any individual responsible for inspecting and collecting sample data using the sample collection application. Consequently, a technician may be an owner, manager, technician and/or service provider who collects physical or other types of samples from assets, containers, or vessels.

In one embodiment, the technician inspects a current asset, collects a current sample from the current asset, and provides the sample collection application with current sample identification data, which identifies the current sample collected by the technician from the current asset. The technician then provides the sample collection application with current asset identification data, which identifies the asset from which the current sample was obtained. The current sample identification data and the current asset identification data may be provided by the technician through the sample collection application in various forms, such as, but not limited to, a textual string, an image/scan of a barcode or serial number associated with the current asset or current sample, or an image of a label that otherwise identifies the current asset or current sample.

In one embodiment, once current asset identification data is obtained by a technician and provided to the sample collection application, the sample collection application accesses the known asset database and analyzes the current asset identification data and the known asset data to determine whether the current asset exists in the known asset database. Upon a determination that the current asset exists in the known asset database, the current sample identification data is then correlated with the current asset identification data, where the current asset identification data identifies an asset associated with the technician in the known asset database. In some embodiments, it may be determined that the current asset does not exist in the known asset database. In one embodiment, if the current asset does not exist in the known asset database, the technician may then be prompted to either correct any erroneous data entry or to create a new asset through a user interface of the sample collection application. In various embodiments, a new asset can be created in a variety of ways, such as, but not limited to, through use of textual asset data, image asset data, or asset barcode data provided by the technician.

In one embodiment, geolocation data may be utilized to identify a current asset based on assets known to be located near the geolocation of the technician. The technician may be provided with a listing of determined known nearby assets to select from, and the asset selected by the technician may be identified as the current asset. In one embodiment, the current asset may be identified using the technician's geolocation data without any direct input from the technician. In various embodiments, the geolocation data of the technician is obtained from the computing system through which the sample collection application is provided to the technician.

In one embodiment, once the current sample identification data has been correlated with the current asset identification data, the technician is provided with a test request user interface through the sample collection application. The test request user interface allows the technician to provide test request data, which represents one or more tests to be run on the current sample represented by the current sample identification data. In one embodiment, once the technician has provided test request data to the sample collection application, test request summary data is provided to the technician through the sample collection application. Upon confirmation of the test request summary data, the current sample identification data and the current asset identification data are correlated with the test request summary data, and the correlated asset, sample, and test data may be stored in the known asset database.

In various embodiments, once the technician has provided test request data for a current sample, the technician may be prompted to repeat the process for any additional samples that the technician might wish to have tested. In some embodiments, when a technician is not able to connect to the internet, any provided current asset data, current sample data, or test request data may be stored offline on the technician's computing system and then later synchronized with the known asset database upon restoration of internet connection.

Once the correlated asset, sample, and test data have been stored in the known asset database, the correlated asset, sample, and test data may be retrieved from the known asset database by an owner, manager, technician, and/or service provider, through the database management application and/or through the sample collection application. The retrieved correlated asset, sample, and test data may then be analyzed and the one or more tests represented by the test request data are performed on the one or more current samples represented by the current sample identification data. Once the one or more tests have been performed on a current sample, test results data may be provided through the database management application and/or through the sample collection application.

Therefore, as discussed in more detail below, the embodiments disclosed herein allow for the effective and efficient acquisition, correlation, tracking, and testing of physical or other types of samples associated with a variety of assets, and as such, the collected sample data is reliably correlated with the correct assets and test requests to ensure that the assets continue to operate safely and effectively.

BRIEF DESCRIPTION OF THE DRAWINGS

FIGS. 8A-8G are exemplary screenshots of asset creation interfaces in accordance with one embodiment.

FIG. 9C is an exemplary screenshot of test request summary data, in accordance with one embodiment.

Figure 1:
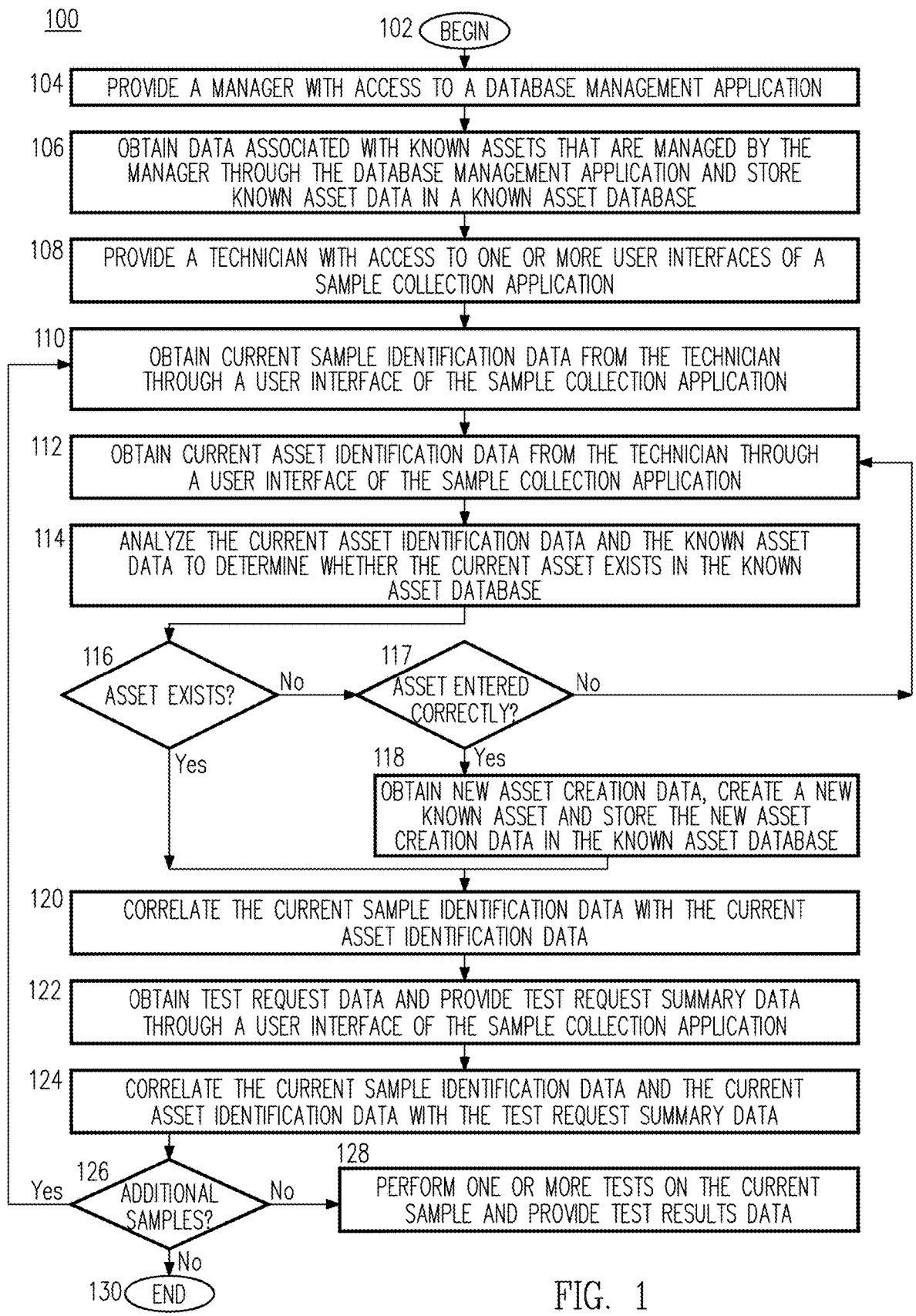
FIG. 1 is a flow chart of a process for acquiring, tracking, and testing sample data in accordance with one embodiment.

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

Embodiments of the present disclosure provide an effective and efficient technical solution to the technical problem of maintaining asset functionality through the acquisition, tracking, and testing of physical or other types of sample data. In the disclosed embodiments, asset data is obtained for assets associated with one or more managers through a database management application, and the asset data is stored as known asset data in a known asset database accessible by the database management application. The known asset database enables tracking and maintenance of the assets, containers and/or vessels associated with each manager. Herein, a manager may be an owner, manager, technician, or service provider associated with one or more assets. As used herein, the term technician includes any individual responsible for collecting physical or other types of samples from assets, containers and/or vessels.

In one embodiment, once a technician has been associated with one or more assets through a database management application, the technician is provided with a user interface through a sample collection application, which allows the technician to obtain and provide asset data and sample data for samples associated with assets. The sample data is then correlated with the corresponding asset. In one embodiment, once the sample has been correlated with the corresponding asset, the technician is presented with a user interface through the sample collection application, which allows the technician to place one or more requests for tests to be performed on the sample. In one embodiment, once the one or more tests have been performed, test results data is provided through the database management application or the sample collection application.

Process

FIG. 1 is a flow chart of a process 100 for acquiring, tracking, and testing sample data in accordance with one embodiment. Process 100 begins at BEGIN 102 and process flow proceeds to 104. At 104, a manager is provided with access to a database management application.

As used herein, the term "manager" may refer to an owner of one or more assets, a manager of one or more assets, a decision-maker responsible for assessing the status of an asset after receiving sample test results, a technician responsible for servicing one or more assets, and/or any other service provider or agent associated with one or more assets. In one embodiment, the manager may be any company or organization that has been given access to a database management application. A manager may also be an individual or group of individuals associated with a company or organization that has been given access to a database management application. In some embodiments, a manager may be a third party not directly associated with any company or organization.

In various embodiments, the database management application may be any type of application that is capable of providing and receiving information to/from a manager through a user interface, including, but not limited to, a desktop computing system application, a mobile computing system application, a cloud computing system application, a virtual reality computing system application, an application provided by an Internet of Things (IoT) device, or any combination thereof. In various embodiments, the application user interface may include any combination of a graphical user interface, an audio-based user interface, a touch-based user interface, or any other type of user interface currently known to those of skill in the art, or any other type of user interface that may be developed after the time of filing.

In one embodiment, once a manager is provided with access to a database management application at 104, process flow proceeds to 106. In one embodiment, at 106, data associated with known assets managed by a manager is obtained and stored in a known asset database.

In the embodiments disclosed herein, the term "asset" may include any type of equipment, machinery, container, vessel, or other object from which a sample can be extracted for analysis and/or testing to determine what maintenance corrective actions need to be taken, if any, or how to handle the contents of the asset, if the sample failed testing. In some embodiments, an asset may be referred to as a "sample source." In some embodiments, a physical or other type of sample may be sampled from a single asset source, while in other embodiments, a physical or other type of sample may be sampled from a container that contains content from multiple sources. Examples of assets include, but are not limited to, transformers, generators, voltage regulators, storage tanks, breakers, (such as, but not limited to, gas-filled breakers, oil-filled breakers, dry breakers, and air breakers, or any other type of breakers known to exist at the time of filing or as may be discovered after the time of filing).

In addition, assets such as wind turbines, solar farm equipment, gas vehicles, electric vehicles, electrical equipment, vehicle equipment, mining equipment, hauling equipment, farming equipment, aviation equipment, oil and gas equipment, shipboard and marine equipment, equipment engines, and equipment motors may be inspected, tested, and sampled. Examples of environmental testing that may need to be performed on these assets include, but are not limited to, testing for temperature, salt spray, humidity, vibration, pressure, acoustics, waste characterization, electrical current/signal conductivity, and/or electromagnetic interference as well as testing of lubricants, hydraulic and other petrochemicals that may either be used in these assets or may be a spent material from these or other assets.

In various embodiments, the asset data may be obtained directly from the manager through a user interface of the database management application. The known asset data obtained from the manager may include any data related to one or more assets associated with the manager. For example, the known asset data may include information such as name, model, type, serial number, unit ID, manufacturer, recommended maintenance schedule, or any other data that may be associated with an asset.

In various embodiments, the database management application may obtain data associated with a manager in addition to obtaining data about the manager's assets. Manager data obtained may include data such as, but not limited to, the name of the manager, the geographical location associated with the manager, payment information associated with the manager, historical information associated with previous tests that were requested by the manager, and/or any other manager data that may be beneficial for the operation of the disclosed embodiments.

In some embodiments, in addition to, or instead of, known asset data being obtained directly from a manager, known asset data may be obtained from one or more third party computing systems, such as, but not limited to, a computing system associated with a distributor or manufacturer. For example, known asset data may be collected from one or more databases maintained by the distributor or manufacturer of one or more assets associated with a manager. In some embodiments the known asset data may be collected from one or more websites associated with a distributor or manufacturer using a variety of data acquisition techniques, such as, but not limited to, screen scraping.

As one illustrative example, an owner may be a company that owns assets responsible for supplying power to a particular geographical region. The owner company may have any number of employees, and one or more of these employees may be in charge of managing the owner's assets on behalf of the owner. One or more of these managers may then request access to the database management application on behalf of the owner. The database management application may be an application provided to a manager through a website, which is accessible from a desktop computer or a mobile device.

Continuing with the above illustrative example, before or after the manager is granted access to the database management application, the manager may be requested to provide identifying information through a user interface provided by the database management application. The database management application may also request that the manager provide information associated with one or more of the owner's assets. The database management application may further request that the manager identify any individuals who should be associated with one or more of the owner's assets. Such individuals may include, but are not limited to, other managers acting on behalf of the owner, decision-makers responsible for assessing the status of an asset, technicians who may be responsible for servicing one or more of the owner's assets, or any other service provider that may provide asset related services on behalf of the owner.

Continuing the above illustrative example, a manager who is an employee of a power company may identify one or more transformers owned by the power company as assets that should be associated with the manager. The manager may further provide data identifying the type and make of the transformers. For example, the manager may identify a transformer as an oil-filled transformer made by a particular manufacturer. Once a type and manufacturer are identified, further asset data may be requested from the manager. Further asset data may also be acquired from a third-party computing system, such as from a website associated with the manufacturer of the asset. The manager may further be provided with a listing of oil-filled transformers made by that manufacturer, and the manager may then be prompted to select a specific transformer model. Once the manager has selected the specific transformer model, the transformer asset becomes associated with both the power company and the manager and this data may be stored in the known asset database, which is accessible by the database management application. The manager may also indicate, through the user interface of the database management application, that several additional individuals should be associated with the transformer asset. For example, a technician or team of technicians may be associated with the transformer asset, and this data may also be stored in the known asset database.

It should be noted that the above example is for illustrative purposes only and should not be construed as limiting the invention as set forth herein. For example, a manager can be one or more individuals associated with any type of company. Further, the owner can be an individual instead of a company, and the owner may also be considered the manager. The manager can also be a service provider, who may utilize the database management application on behalf of one or more owner clients without the need to grant the owner clients access to the database management application. Further, the database management application does not need to be a web-based application. As noted above, the database management application can be any type of application, such as, but not limited to, a stand-alone application that does not provide a web-based interface.

In one embodiment, once known asset data is obtained from one or more managers and stored in the known asset database at 106, process flow proceeds to 108. In one embodiment, at 108, a technician is provided with one or more user interfaces through a sample collection application.

As already discussed above, as used herein, the term "technician" may refer to an owner, manager, technician, or service provider who is responsible for collecting physical or other types of sample data using the sample collection application.

In one embodiment, the sample collection application may be any type of application that is capable of providing and receiving information to/from a technician through a user interface, including, but not limited to, a desktop computing system application, a mobile computing system application, a cloud computing system application, a virtual reality computing system application, an application provided by a handheld scanning device, an application provided by an Internet of Things (IoT) device, or any combination thereof.

In various embodiments, the user interface provided by the sample collection application may include any combination of a graphical user interface, an audio-based user interface, a touch-based user interface, or any other type of user interface currently known to those of skill in the art, or any other type of user interface that may be developed after the time of filing.

Figure 3:
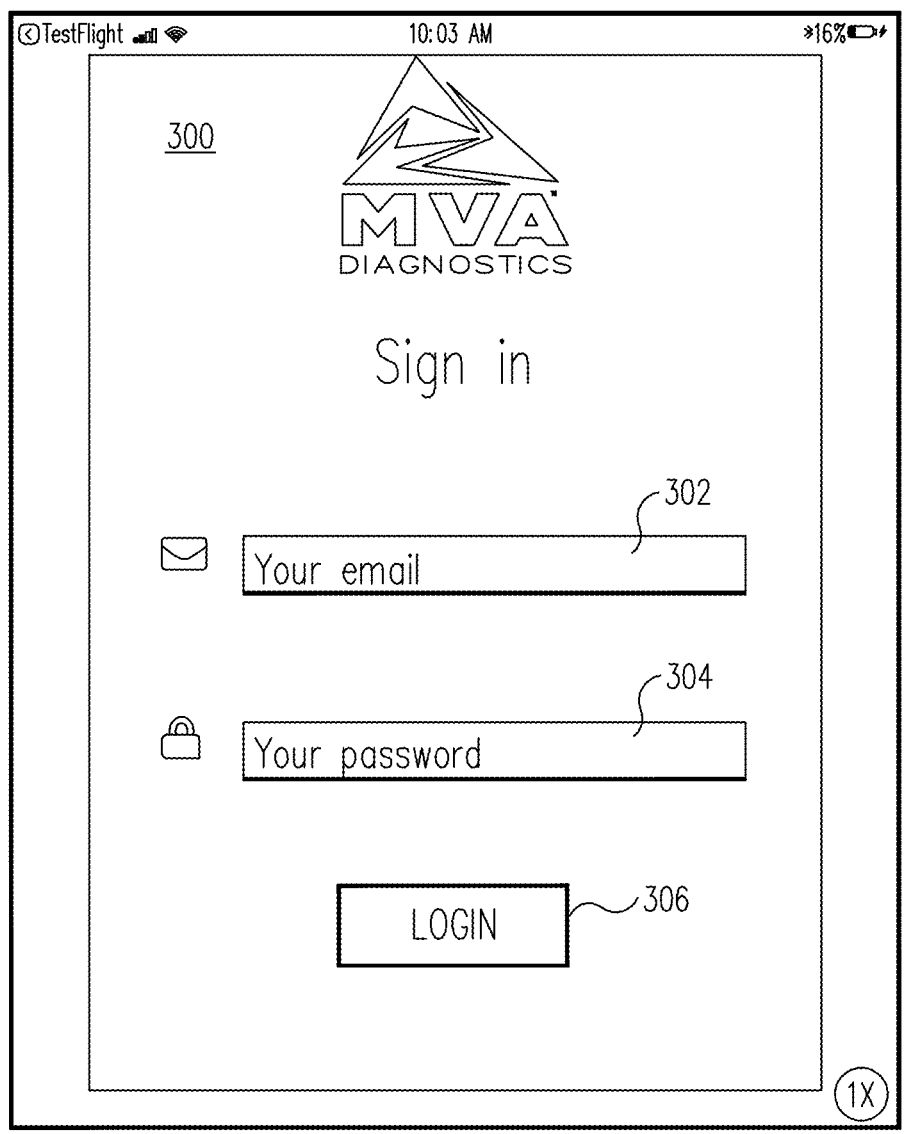
FIG. 3 is an exemplary screenshot of a login screen associated with an application user interface for acquiring, tracking, and testing sample data in accordance with one embodiment.

In one embodiment, the technician is provided with a user interface to the sample collection application, and the technician may be prompted to enter authentication credentials in order to proceed. As one illustrative example, FIG. 3 depicts an exemplary screenshot of a login screen 300 associated with a user interface provided by the sample collection application, in accordance with one embodiment. In the illustrative embodiment of FIG. 3, the technician is presented with a prompt to enter authentication credentials including email credential 302 and password credential 304. In one embodiment, the technician may already have existing login credentials, for example, such as login credentials associated with previously being granted access to the database management application and/or the sample collection application. If the technician has an existing email credential 302 and password credential 304, the technician may then proceed to log into the sample collection application through login element 306. In another embodiment, the technician may not have previously accessed the database management application and/or the sample collection application, and so may not have existing email credential 302 and password credential 304, in which case, the technician may be prompted to create new login credentials. In various other embodiments, credentials that are required to log into the sample collection application may be credentials other than email credential 302 and password credential 304. For example, a username may be required in place of, or in addition to, email credential 302. Further, alternative or additional authentication techniques may be used to grant a technician access to the sample collection application, including for example, fingerprint authentication, voice authentication, and/or facial recognition.

Returning again to FIG. 1, in one embodiment, once a technician is provided with one or more user interfaces through the sample collection application at 108, process flow proceeds to 110. In one embodiment, at 110, current sample identification data is obtained through a user interface of the sample collection application.

Figure 4:
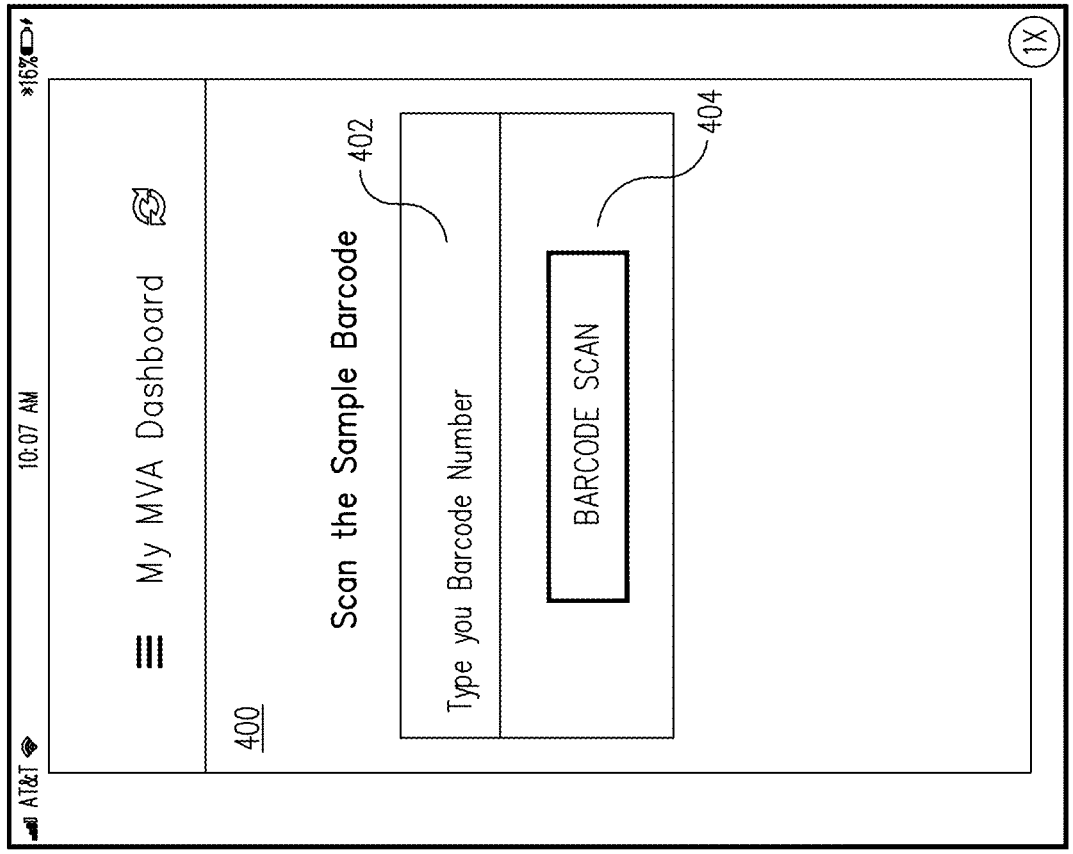
FIG. 4 is an exemplary screenshot of an interface for assigning a sample barcode to an asset, in accordance with one embodiment.

FIG. 4 depicts an exemplary screenshot of an interface 400 for assigning a sample barcode to an asset, which is a portion of the sample collection application user interface, and is utilized for obtaining current sample identification data, in accordance with one embodiment. In one embodiment, the technician may manually enter a barcode number, or other identifying data associated with a current sample, into barcode number field 402 of sample identification interface 400. In another embodiment the technician may elect to use the computer or device that is running the sample collection application to scan a barcode associated with the current sample, or to scan other identifying current sample data, by selecting barcode scan element 404. In some embodiments, a technician is also given an option to take a photograph of the current sample and/or current sample identification data for later processing.

In various embodiments, prior to scanning or otherwise capturing the current sample identification data, a current sample must first be obtained by the technician. In general, a sample may be any type of sample associated with a sample source, such as, but not limited to, an asset, container, and/or vessel from which the sample is extracted. However, typically a particular type of sample is selected such that testing the sample will yield valuable information about the sample source. As one specific illustrative example, if the sample source is an oil-filled transformer, then running one or more tests on the oil in the transformer can yield information about the status and functionality of the transformer. Therefore, in this illustrative example, a physical sample of oil in the transformer would be extracted from the transformer and stored in a container for later testing. The transformer oil that is stored in the container would then be referred to as the current sample, and identification information would typically be placed on the sample container.

In some embodiments, a sample is not taken directly from an asset, but is taken from a storage object associated with the asset. As one illustrative example, byproducts and/or spent materials may be generated from an asset as a result of a manufacturing process that utilizes the asset. These byproducts and/or spent materials may be stored in a vessel such as a container, tank or a drum. Further, in some embodiments, the vessel may be a collection tank that contains physical product, byproducts and/or spent materials from multiple, potentially hundreds of assets. In one embodiment, physical samples of the byproducts and/or spent materials may be extracted from the vessel in order to perform waste characterization testing, and upon receiving results of the testing, a manager can then make a decision regarding what to do with the asset, the byproducts and/or the spent materials. Consequently, in some embodiments, the term "sample," or "physical sample" as used herein includes samples which may or may not be stored externally to the asset. Further, in some embodiments, the vessel itself may be an asset.

In various embodiments, sample types include, but are not limited to, fluid samples, gas samples, solid samples, electrical samples, and data samples. In the case of physical samples, such as fluid samples, gas samples, and solid samples, once extracted from the asset, container and/or vessel, the physical sample may be stored in any type of container that is appropriate, depending on the properties of that particular sample type.

In various embodiments, electrical or data samples are required as a result of a diagnostic warning from an alarm. This may require the technician to perform the testing on site, and store the samples electronically, or have the test performed via communication with the database management application through the sample collection application, so that valuable data information can either be evaluated in real time or can be evaluated after collection of the data. In some embodiments, an electrical or data sample may be stored in a computer file, which may itself further be stored in an appropriate data storage container, such as, but not limited to, a hard drive, flash drive, or data server, such as those utilized by cloud computing systems.

In one embodiment, either prior to or after collection of a current sample, the container the current sample is or will be stored in is typically marked with some type of identification. Identification for a physical sample may include a barcode, serial number, textual description, and/or any other type of identification data that may be used to differentiate the current sample from other samples. In the case of other types of samples, identification may include a filename or a memory address. In various embodiments, the identification data may be affixed to or associated with the current sample container using any means available, such that the current sample identification data may be reliably associated with the current sample.

Figure 5:
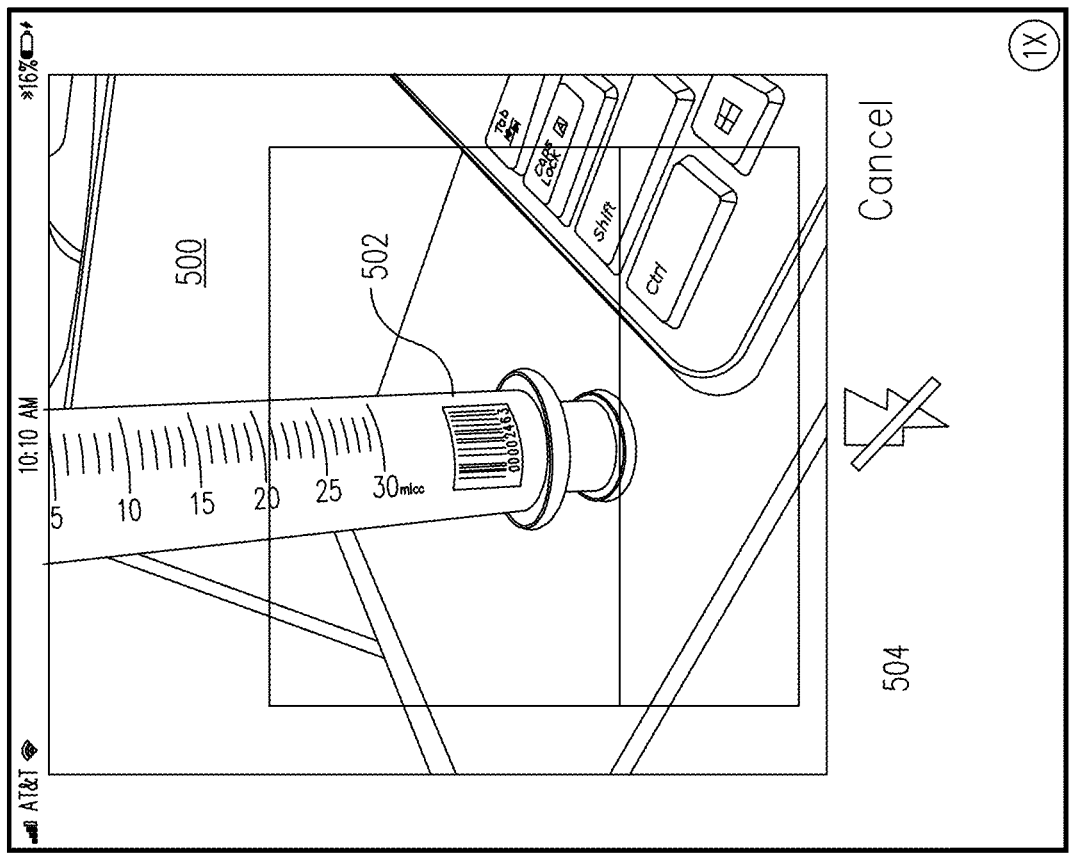
FIG. 5 is an illustrative example of a physical sample barcode being scanned into a computing system, in accordance with one embodiment.

FIG. 5 depicts an illustrative example of a physical sample barcode being scanned into a computing system, in accordance with one embodiment. Referring now to FIG. 4 and FIG. 5 together, once the technician has selected barcode scan element 404 of sample identification interface 400, a viewfinder, such as viewfinder 504, may be presented to the technician, which allows the technician to direct an optical element of a computer or device towards sample identification barcode 502 of physical sample 500 in order to capture the current sample identification data.

In one embodiment, the current sample identification data assigned to a physical or other type of sample is linked to a customer's work order and pricing structure. For example, the technician may work for a company that manages assets for its customers, and each customer may be associated with a different pricing structure. As will be discussed in additional detail below, this allows a cost to be assigned to each sample, depending on what tests the customer orders, thus enabling customer invoices to be automatically calculated and presented to the customer for payment.

In various embodiments, in addition to collecting physical or other types of samples from assets, containers, and/or vessels, the technician may perform an inspection of the asset, container and/or vessel, and the resulting inspection data may also be provided to the sample collection application. In one embodiment, the inspection data may be referred to as a data sample. In one embodiment, the data sample resulting from an inspection may be correlated with the asset, container, and/or vessel, in much the same way as a physical sample is correlated with the asset, container, and/or vessel, as will be described in detail below.

Returning now to FIG. 1, in one embodiment, once current sample identification data has been obtained at 110, process flow proceeds to 112. In one embodiment, at 112, current asset identification data is obtained through a user interface of the sample collection application. The current asset identification data identifies an asset associated with the current sample obtained by the technician at 110.

Figure 6B:
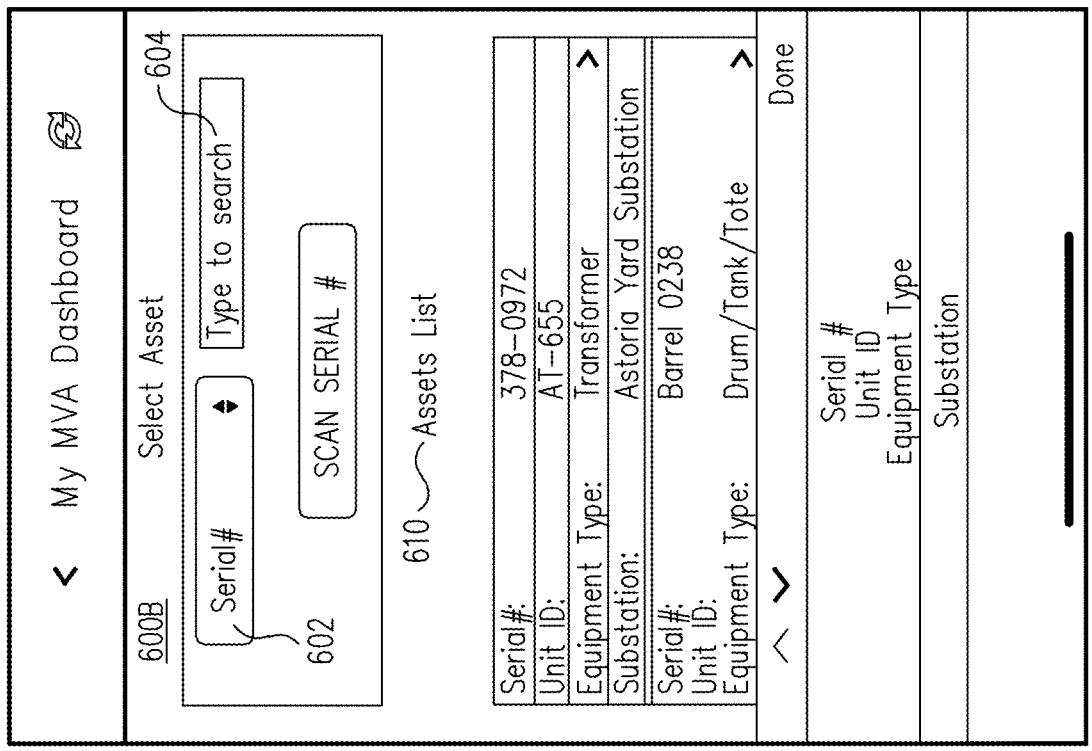
FIG. 6A and FIG. 6B are exemplary screenshots of asset identification interfaces in accordance with one embodiment.
Figure 6A:
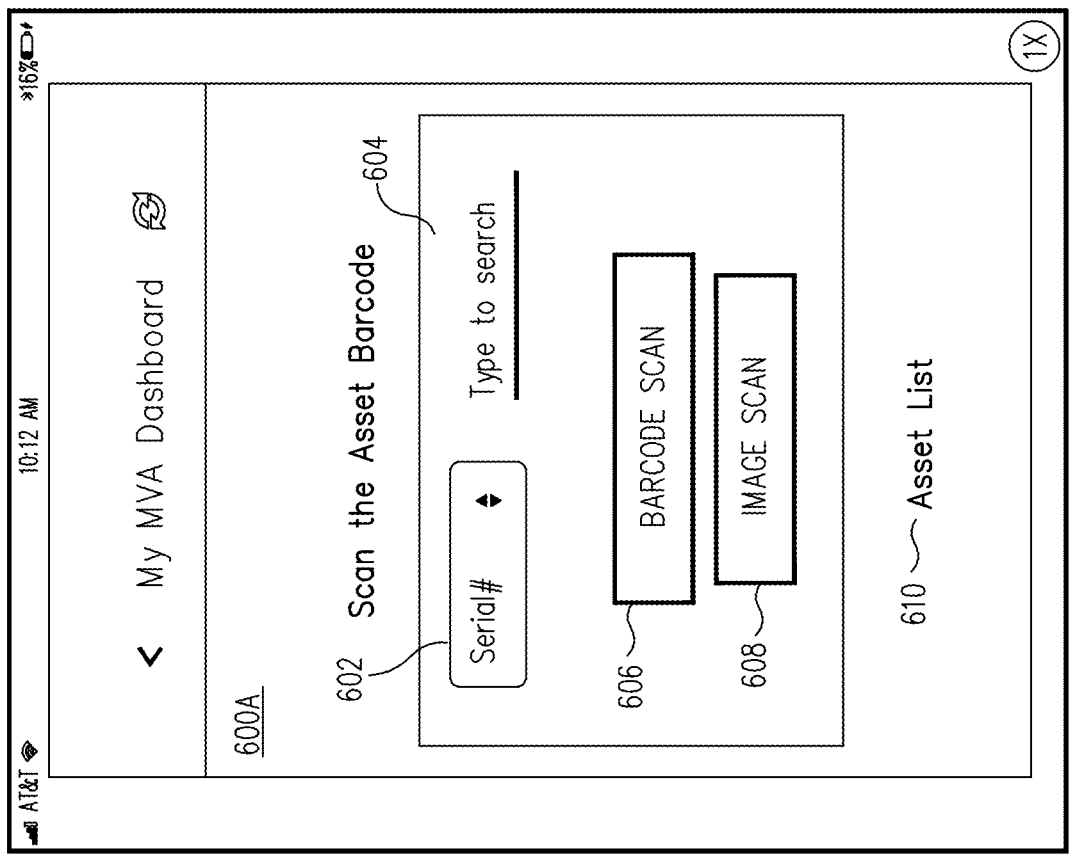

FIG. 6A depicts an exemplary screenshot of an asset identification interface 600A, which is a portion of the sample collection application user interface, and is utilized for obtaining current asset identification data, in accordance with one embodiment. In the exemplary embodiment depicted in FIG. 6A, in order to obtain identification data associated with a current asset, the technician is presented with several options for providing the current asset identification data through the asset identification interface 600A. In various embodiments the options include, but are not limited to, manually entering a serial number into serial number field 602, manually entering an alphanumeric string into text search field 604, selecting barcode scan element 606, selecting image scan element 608, selecting assets list element 610, or using a scroll wheel as depicted in asset identification interface 600B of FIG. 6B to change the search field 604, as one example, to manually enter a location as an alphanumeric string into text search field 604.

In one embodiment, if the technician elects to identify the current asset using serial number field 602, the technician may either manually type a serial number into serial number field 602, or the technician may be able to manually select from one or more stored serial numbers. In one embodiment, if the technician elects to identify the current asset using text search field 604, the technician may be presented with a listing of assets that match the text entered by the technician in text search field 604.

In some embodiments, if the technician chooses to identify the current asset using barcode scan element 606 or image scan element 608, the technician may capture the current asset barcode identification data or current asset image identification data using the computer or device that is running the sample collection application. In order to capture the current asset barcode or image identification data, a viewfinder may be presented to the technician, which allows the technician to direct an optical element of a computer or device towards a physical portion of the current asset that contains identification information. One example of a physical portion of an asset containing identification information is a nameplate, which is typically affixed to an asset.

Figure 7:
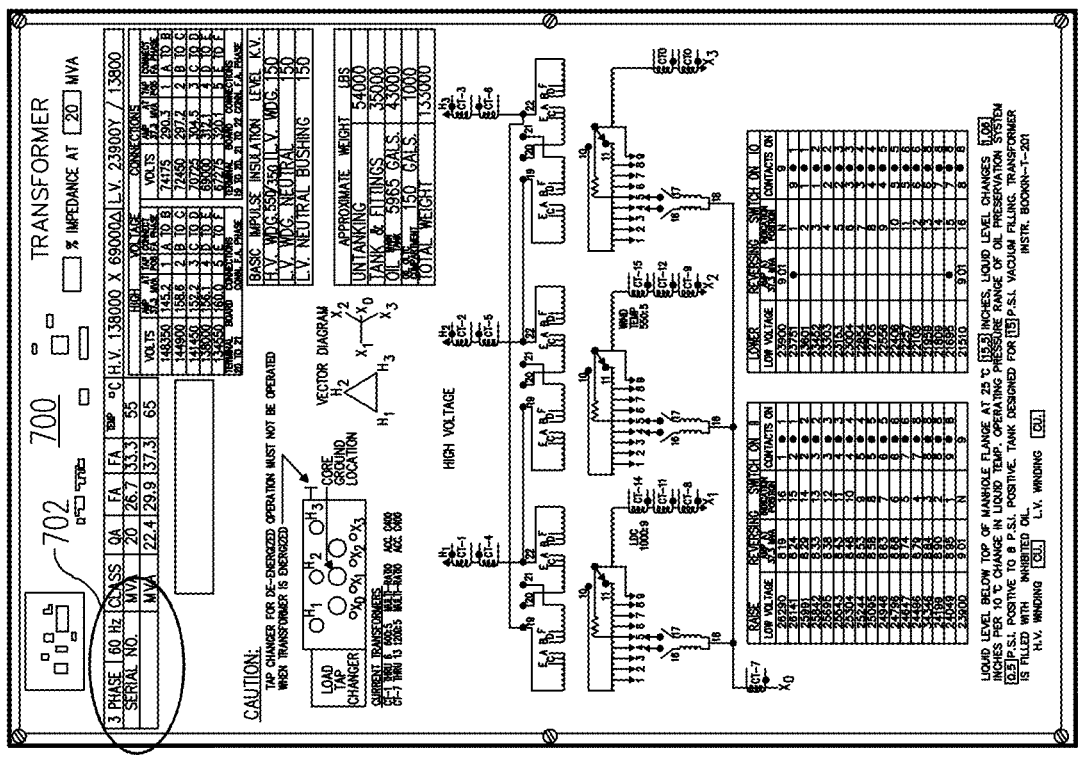
FIG. 7 is an example of an asset nameplate that may be affixed to an asset, in accordance with one embodiment

FIG. 7 is an example of an asset nameplate 700 that may be affixed to an asset, in accordance with one embodiment. An asset nameplate may provide a serial number, such as asset serial number 702 of asset nameplate 700, and typically contains a variety of additional information related to the asset, which may also be used to identify the asset, should a serial number not be present. As such, a barcode or image scan of the nameplate may be used to provide asset identification data.

In various situations, the location of asset serial number 702 may be consistent from nameplate to nameplate on various assets, particularly assets of the same type. In these cases, data field identification formatting, such as JSON formatting, can be utilized to automatically identify the serial number data field and capture data representing asset serial number 702.

Returning to FIG. 6A, the technician may also choose to select asset list element 610 in order to provide current asset identification data. In one embodiment, selecting asset list element 610 from asset identification interface 600A would provide the technician with a list of assets known to be associated with the technician. The listing of assets may be obtained by the sample collection application from the known asset database of the database management application. The technician would then be able to select the appropriate asset from the asset listing in order to provide the current asset identification data.

In one embodiment, geolocation data may be utilized to identify a current asset based on assets known to be located near the geolocation of the technician. The technician may be provided with a listing of determined known nearby assets to select from, and the asset selected by the technician may then be identified as the current asset. In one embodiment, the current asset may be identified using the technician's geolocation data without any direct input from the technician. For example, if only one asset is located near the technician, that asset may automatically be identified as the current asset. In various embodiments, the geolocation data of the technician is obtained from the computer or device through which the sample collection application is provided to the technician.

Returning now to FIG. 1, in one embodiment, once current asset identification data has been obtained at 112, process flow proceeds to 114. In one embodiment, at 114, the current asset identification data is analyzed to determine whether the current asset identified by the current asset identification data exists in the portion of the known asset database associated with the technician.

In one embodiment, analysis of the current asset identification data is performed by comparing the current asset identification data to the known asset data that is stored in the portion of the known asset database associated with the technician. In one embodiment, the analysis of the current asset identification data can indicate at least two different outcomes. One outcome is that a match was found between the current asset identification data and an asset already known to be associated with the technician, and so the analysis at 114 arrives at a determination that the current asset already exists in the portion of the known asset database associated with the technician. Another possibility is that no match was found between the current asset identification data and any assets known to be associated with the technician, and so the analysis at 114 arrives at a determination that either some type of error occurred, or that the current asset has not yet been created and/or associated with the technician in the known asset database.

In one embodiment, once the current asset identification data has been analyzed at 114, process flow proceeds to 116. In one embodiment, at 116, appropriate action is taken depending on whether the outcome of the current asset identification analysis indicated that the current asset exists in the known asset database, or the current asset identification analysis indicated that the current asset does not exist in the known asset database.

In one embodiment, if the outcome of the current asset identification analysis indicates that the current asset does exist in the known asset database, process flow proceeds from 116 to 120, which will be discussed in further detail below. In one embodiment, if the outcome of the current asset identification analysis indicates that the current asset does not exist in the known asset database, process flow proceeds to 117.

In one embodiment, at 117, the technician may be presented with a notification message through the user interface of the sample collection application indicating that the current asset was not found in the known asset database. Upon receiving the notification message, the technician may determine that an error occurred in entering the current asset identification data, and the technician may simply attempt to rescan or retype the current asset barcode and/or serial number, and then operations 112 and 114 discussed above for obtaining and analyzing the current asset identification data would be repeated.

In one embodiment, upon a determination at 117 that the asset was entered correctly, the technician may be presented with an option to create a new asset through the user interface of the sample collection application, and process flow proceeds to 118. In one embodiment, at 118, new asset creation data is obtained and a new known asset is created and stored in the portion of the known asset database that is associated with the technician.

FIGS. 8A-8G together depict illustrative examples of various portions of new asset creation interface 800, which may be provided to the technician through the user interface of the sample collection application, in accordance with one embodiment. Through the new asset creation user interface 800, various new asset creation data fields 802 may be presented to the technician to enable the technician to provide requested new asset creation data. New asset creation data requested from the technician may include data such as, but not limited to, serial number, substation or location associated with the asset, unit ID, status, equipment type, manufacturer, year of manufacture, power rating, capacity, fluid type, number of phases, and breather configuration.

In various embodiments, some of the new asset creation data fields 802 may allow the technician to enter alphanumeric strings, while other new asset creation data fields 802 may incorporate graphical user elements, such as dropdown lists or scroll wheels, which allow the technician to select from any number of predefined options.

The illustrative example of FIG. 8A depicts a subset of the new asset creation data fields 802, which, in one embodiment, are presented to the technician through the new asset creation user interface 800, to allow for the entry of new asset creation data.

The illustrative example of FIG. 8B depicts a subset of the new asset creation data fields 802, which, in one embodiment, are presented to the technician through the new asset creation user interface 800, to allow for the entry of new asset creation data. Further, upon selection of a particular data field, such as equipment type data field 804, the technician may be presented with equipment scroll wheel 806, which contains a list of predetermined equipment types, and allows the technician to select the appropriate equipment type.

Figures 8C, 8D:
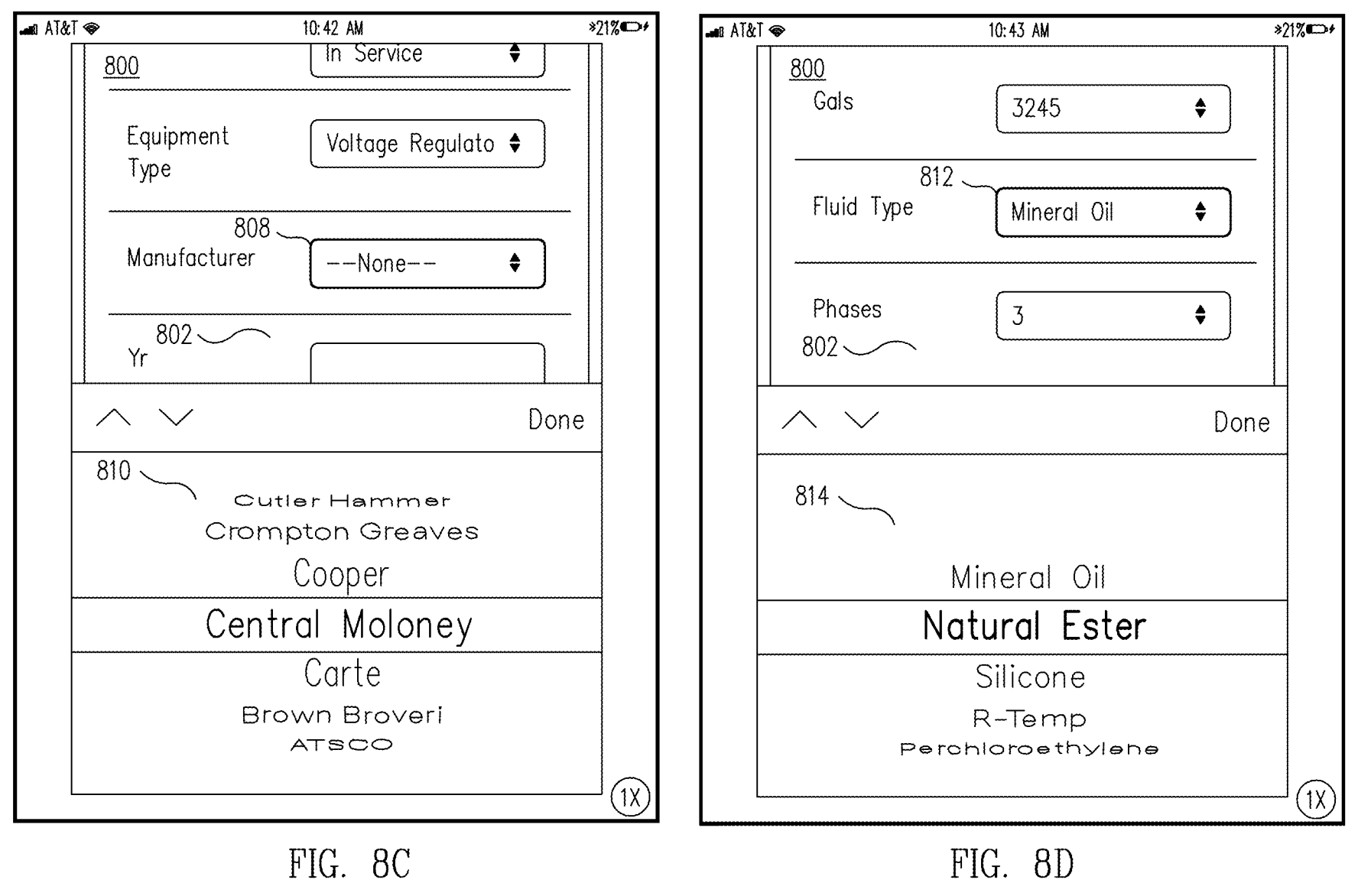

The illustrative example of FIG. 8C depicts a subset of new asset creation data fields 802, which, in one embodiment, are presented to the technician through the new asset creation user interface 800, to allow for the entry of new asset creation data. Further, upon selection of a particular data field, such as manufacturer data field 808, the technician may be presented with manufacturer scroll wheel 810, which contains a list of predetermined manufacturers, and allows the technician to select the appropriate manufacturer.

The illustrative example of FIG. 8D depicts a subset of new asset creation data fields 802, which, in one embodiment, are presented to the technician through the new asset creation user interface 800, to allow for the entry of new asset creation data. Further, upon selection of a particular data field, such as fluid type data field 812, the technician is presented with fluid scroll wheel 814, which contains a list of predetermined fluid types, and allows the technician to select the appropriate fluid type.

The illustrative example of FIG. 8E depicts a subset of new asset creation data fields 802, which, in one embodiment, are presented to the technician through the new asset creation user interface 800, to allow for the entry of new asset creation data. Further, upon selection of a particular data field, such as breather configuration data field 813, the technician is presented with breather configuration scroll wheel 815, which contains a list of predetermined types of breather configurations, and allows the technician to select the appropriate type of breather configuration.

The illustrative example of FIG. 8F, depicts a subset of new asset creation data fields 802, which, in one embodiment, are presented to the technician through the new asset creation user interface 800, to allow for the entry of new asset creation data. Once the technician has entered some or all of the requested information into the new asset creation user interface 800, the technician may be presented with the option to save the new asset creation data through new asset save element 816. In one embodiment, once the technician has selected new asset save element 816, the new asset creation data may be stored in the portion of the known asset database associated with the technician, and the new known asset becomes a part of the known asset data.

Figure 8G:
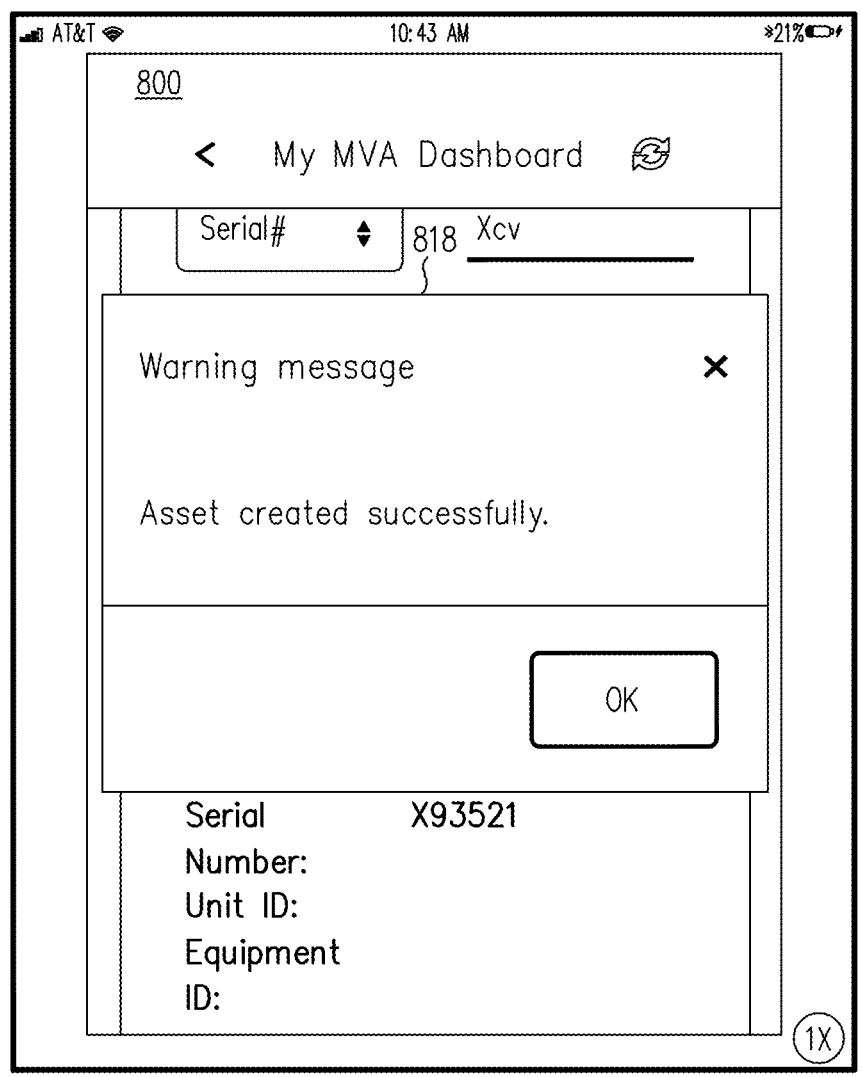

The illustrative example of FIG. 8G, depicts a success notification message 818, which, in some embodiments, is presented to the technician to inform the technician that the new known asset was successfully created in the database management application.

In one embodiment, geolocation data may be utilized to create a new known asset based on assets known to be located near the geolocation of the technician. The technician may be provided with a listing of determined known nearby assets to select from, and the asset data associated with the asset selected by the technician may be used as new asset creation data to create the new known asset. In one embodiment, a new known asset may be created using the technician's geolocation data without any direct input from the technician. For example, if only one asset is located near the technician, that asset may automatically be selected. In various embodiments, the geolocation data of the technician is obtained from the computer or device through which the sample collection application is provided to the technician.

Returning to FIG. 1, in one embodiment, upon a determination at 114 that the current asset already exists in the portion of the known asset database associated with the technician, or upon creation of a new known asset at 118, process flow proceeds to 120. In one embodiment, at 120 the current sample identification data previously obtained at 112 is correlated with the current asset identification data either previously obtained at 110, or newly created during the new asset creation process at 118.

In one embodiment, the asset-sample correlation process includes forming an association between the current sample identified by the current sample identification data, and the current asset identified by the current asset identification data, which results in the generation of correlated asset and sample data. In one embodiment, the correlated asset and sample data may then be stored in the portion of the known asset database associated with the technician for further processing.

In one embodiment, once current sample identification data is correlated with current asset identification data at 120, process flow proceeds to 122. In one embodiment, at 122, test request data is obtained from the technician indicating one or more tests to be performed on the current sample represented by the current sample identification data. In various embodiments, the test request data is obtained through a test selection user interface, which is presented to the technician through the user interface of the sample collection application.

In one embodiment, prior to presenting the technician with the test selection user interface, the correlated asset and sample data is analyzed to determine which tests are available to be performed for the current sample. For example, different types of assets will typically require different types of tests, and different types of samples for the same type of asset will also typically require different types of tests. Therefore, before the technician can be presented with test options through the test selection user interface, the available types of tests for the current sample should be determined. In one embodiment, specific test recommendations might also be provided to the technician through the test selection user interface of the sample collection application.

Figure 9B:
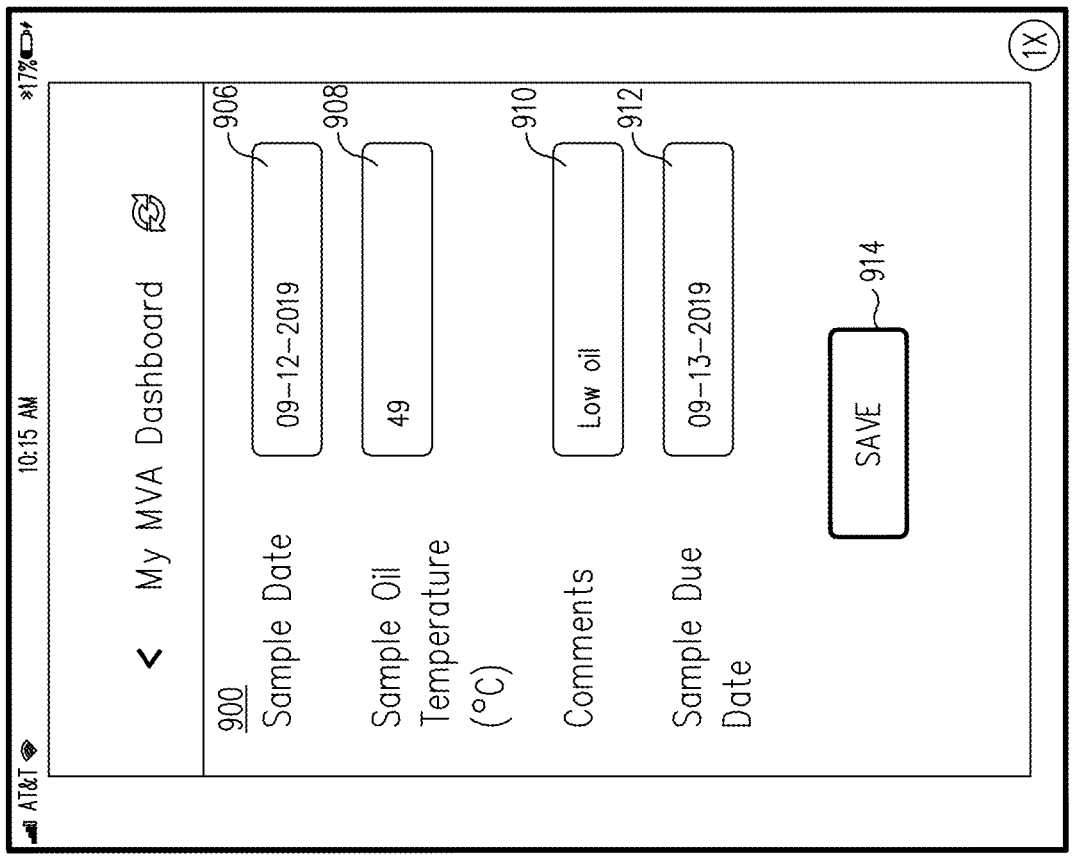
FIG. 9A and FIG. 9B are exemplary screenshots of test selection interfaces, in accordance with one embodiment.
Figure 9A:
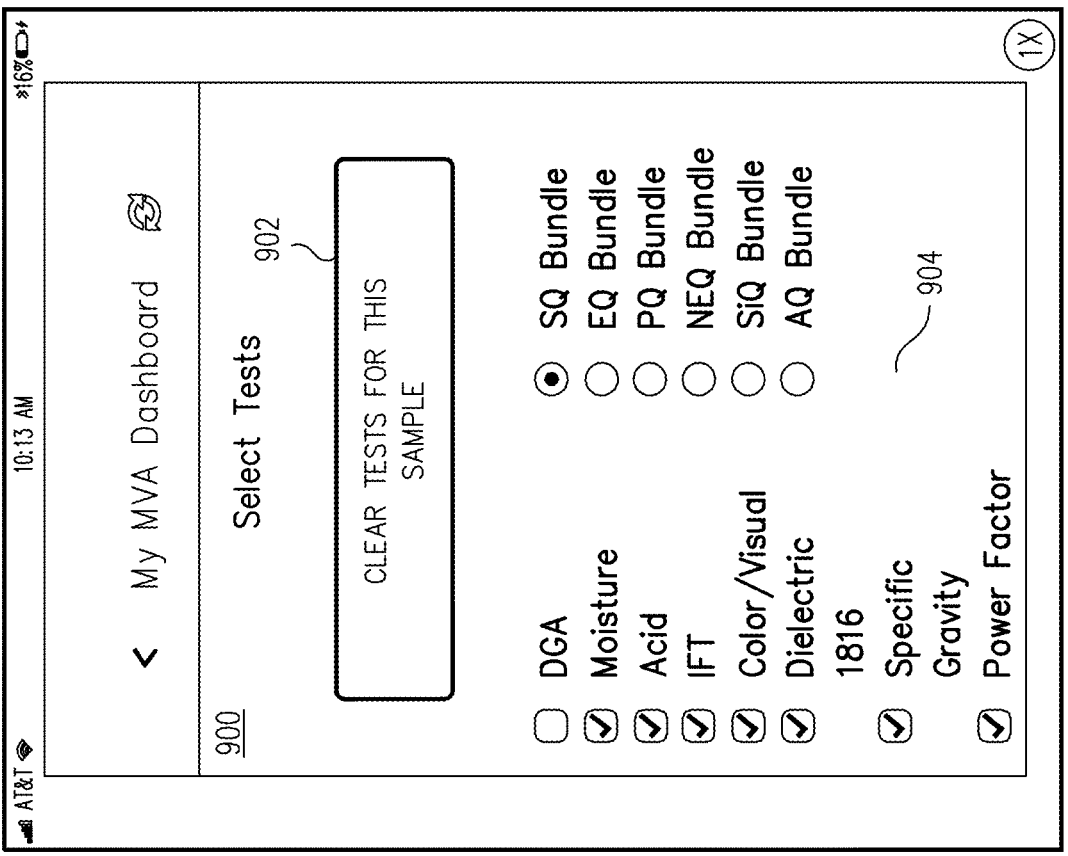

FIG. 9A and FIG. 9B depict illustrative examples of various portions of a test selection user interface 900 provided by the sample collection application, in accordance with one embodiment. In the illustrative embodiment depicted in FIG. 9A and FIG. 9B, the test selection user interface 900 includes sample clearing element 902, sample test options 904, sample date field 906, sample temperature field 908, comments field 910, sample due date field 912, and save element 914. Sample test options 904 may include a variety of user interface elements, such as, but not limited to, checkboxes and radio buttons, which allow a technician to specify one or more types of tests that they would like to have performed on a physical sample. As noted above, in various embodiments, the types of tests that are listed as available for a technician to select may vary depending on the specific type of asset associated with the physical sample. Consequently, the test names that are shown as part of sample test options 904 should not be construed as limiting the invention as disclosed herein, and as set forth in the claims below. Sample clearing element 902 is offered to the technician for convenience in resetting the test selection user interface 900.

In various embodiments, additional test request data may be requested from a technician through the test selection user interface 900. Examples of additional test request data that may be requested for a physical sample include, but are not limited to, inspection report data described above and claimed below, such as the date on which the current sample was collected, the temperature of the current sample on the date the current sample was collected, any inspection comments that the technician may have regarding the current sample and/or the test request, and a date that the technician would like to receive the test results by. In various embodiments, the technician may enter none, some, or all of these additional pieces of test request data into sample date field 906, sample temperature field 908, comments field 910, and sample due date field 912. Consequently, in some embodiments the test request data and/or sample data also includes inspection report data. Once the technician has completed providing the test request and/or inspection report data, the technician may save the test request data using save element 914 of the test selection user interface 900. In one embodiment, once the technician has selected to save the test request data, the test request data may be stored in the portion of the known asset database associated with the technician.

In one embodiment, once test request data is obtained from the technician through the sample collection application, test request summary data may be provided to the technician through a user interface of the sample collection application, where the test request summary data summarizes the one or more tests to be performed on the current sample. In various embodiments, the test request summary data may include current asset identification data, such as equipment type and a serial number associated with the current asset, current sample identification data, such as a barcode associated with the current sample, a preview of the test options that were selected, and/or any other information regarding the test request that the technician may wish to review.

Figure 9C:
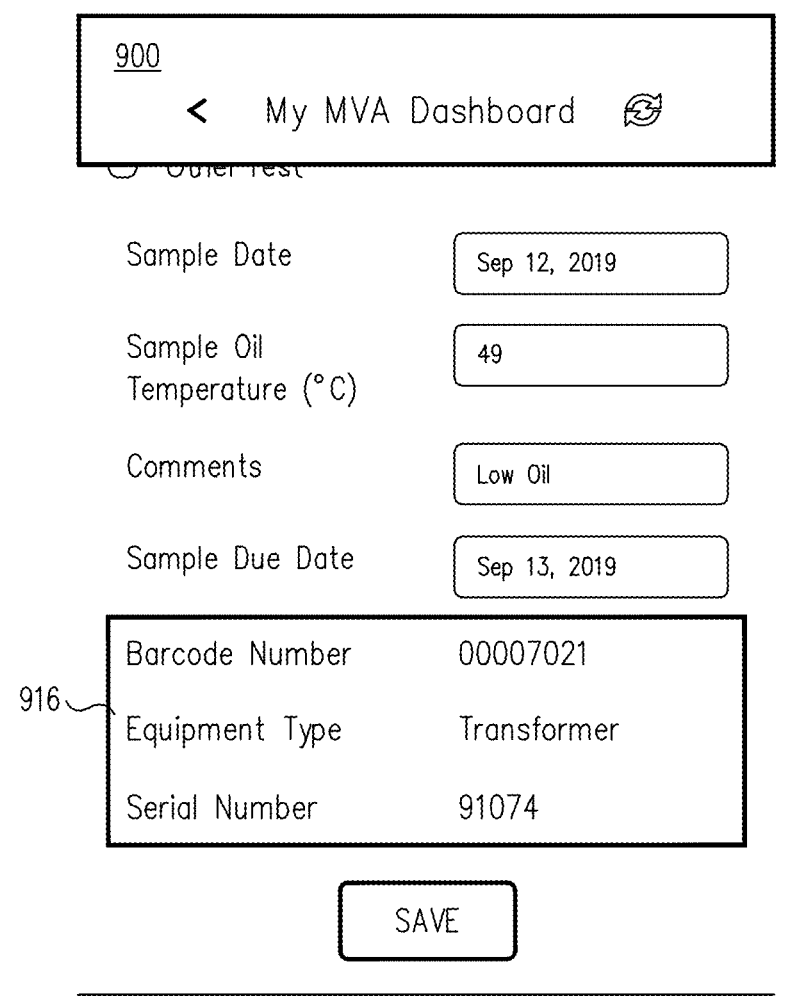

FIG. 9C depicts an illustrative example of test request summary data 916, which may be provided to the technician through test selection user interface 900, in accordance with one embodiment.

Returning now to FIG. 1, in one embodiment, once the technician is provided with test request summary data at 122, process flow proceeds to 124. In one embodiment, at 124, the current sample identification data and the current asset identification data are correlated with the test request summary data.

In one embodiment, the asset-sample-test correlation process includes forming an association between the current sample identified by the current sample identification data, the current asset identified by the current asset identification data, and the test request summary data, which indicates the tests to be run on the current sample. The asset-sample-test correlation process results in the generation of correlated asset, sample, and test data. In one embodiment, the correlated asset, sample, and test data may then be stored in the portion of the known asset database associated with the technician for further processing.

As discussed above, in one embodiment, the sample identification data assigned to a physical or other type of sample is linked to a customer's work order and pricing structure, which allows a cost to be assigned to each sample, depending on what tests the customer orders. Consequently, once the correlated asset, sample, and test data is generated, one or more customer invoices can be automatically calculated and presented to the customer for payment.

Figure 10:
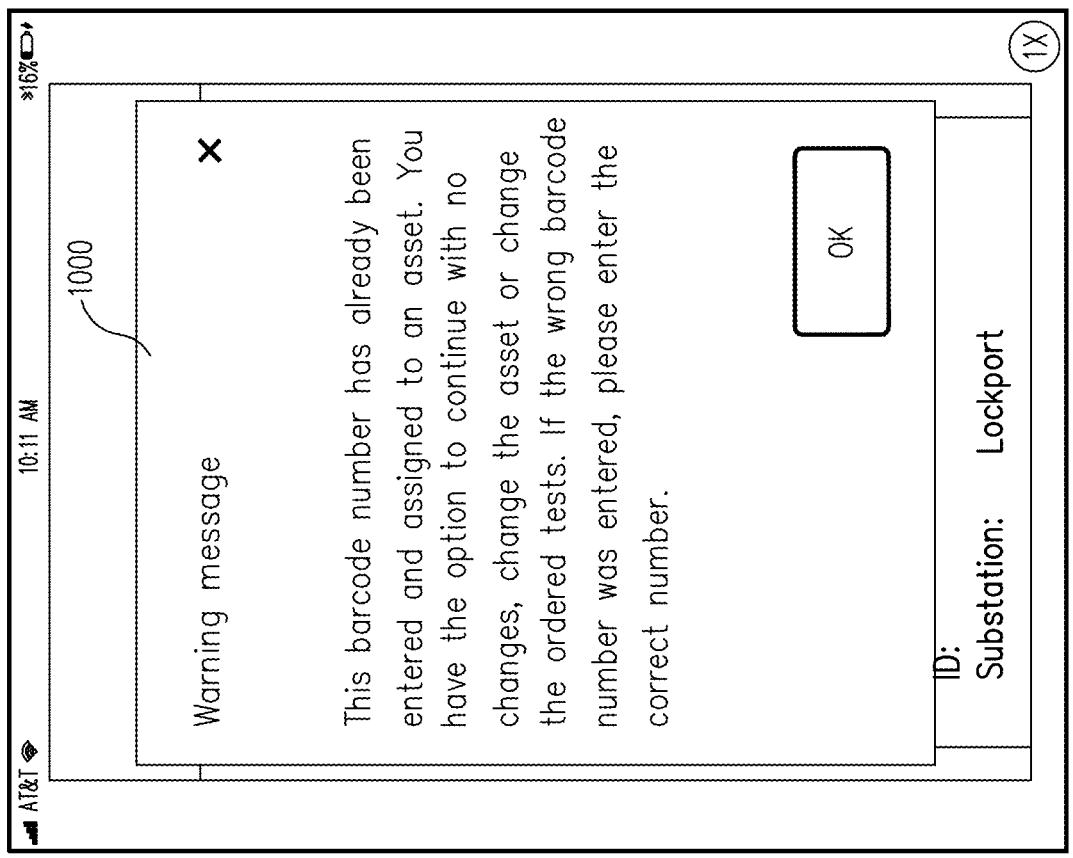
FIG. 10 is an illustrative example of a notification message that may be presented, in accordance with one embodiment.

Either during the asset-sample correlation process at 120, or during the asset-sample-test correlation process at 124, it may be determined that a sample having the same sample identification data as the current sample has already been correlated with the asset identified by the technician as the current asset, and the technician may be presented with a notification to inform the technician of the possibility that the sample may be a duplicate. FIG. 10 depicts one illustrative example of a notification message 1000 that may be presented to a technician in such scenarios, in accordance with one embodiment. It should be noted that multiple types of notification messages or alternate wordings of notification messages may be used, other than the one depicted in the illustrative example of FIG. 10.

Figure 11:
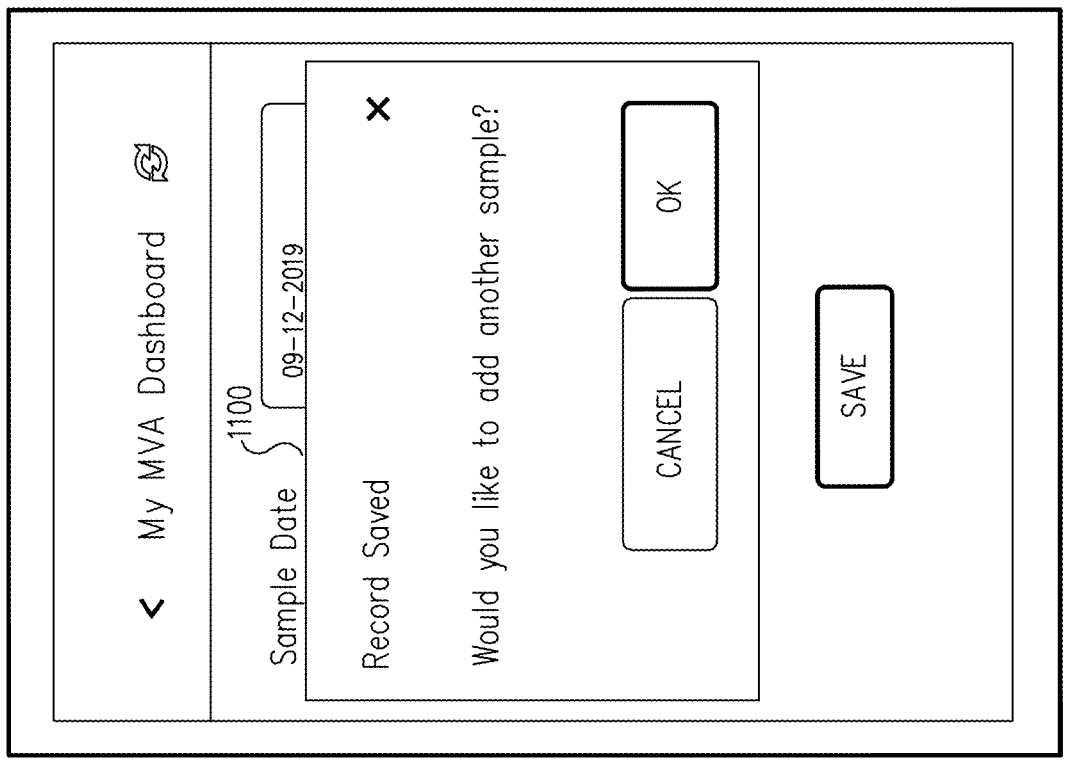
FIG. 11 is an illustrative example of a prompt that may be presented, in accordance with one embodiment.

In one embodiment, once the current sample identification data and the current asset identification data have been correlated with the test request summary data at 124, process flow proceeds to 126. In one embodiment, at 126, after the technician has submitted test request data for the current sample, the technician may be prompted through a user interface of the sample collection application to indicate whether they would like to repeat the process for an additional physical sample. FIG. 11 is an illustrative example of an add sample prompt 1100, which may be presented to the technician in accordance with one embodiment.

In one embodiment, upon a determination at 126 that the technician would like to add an additional sample, process flow returns to 110, and operations 110, 112, 114, 116, 117, 118, 120, 122, 124, and 126, as discussed above, are repeated.

In one embodiment, upon a determination at 126 that the technician would not like to process an additional sample, the test request data is submitted for processing and process flow proceeds to 128. In one embodiment, at 128, once the technician has submitted the test request data electronically through the sample collection application, the technician may also need to deposit the associated samples to a testing service provider for processing. Once the testing service provider receives a sample, the testing service provider may access the test request summary data associated with the sample from the known asset database through the database management application, and proceed to perform the one or more tests indicated by the test request summary data. Once the one or more tests indicated by the test request summary data have been performed, test results data representing the results of the performed tests may then be stored in the known asset database, or otherwise provided through the database management application and/or the sample collection application. The test results data may then be reviewed through the database management application and/or the sample collection application by any parties associated with the asset corresponding to the test results data, such as the owner, one or more managers, one or more decision-makers, one or more technicians, and/or one or more service providers.

In one embodiment, upon a determination at 126 that the technician would not like to process an additional sample, the one or more tests are ordered on the current sample, and process flow proceeds to END 130 and the process 100 for acquiring, tracking, and testing sample data is exited to await new data and/or instructions.

It should be noted here, that although many of the above discussed operations are described as being performed by a technician, many of these operations can also be performed by a different party, not located at the site of the current asset. For example, once a technician has obtained current asset identification data and current sample identification data, that data may be correlated and then accessed by an owner, a manager, a decision maker, a technician other than the technician responsible for obtaining the physical sample, or some other type of service provider, in order to make decisions about what tests should be run on the current sample and provide the test request data.

System

Figure 2A:
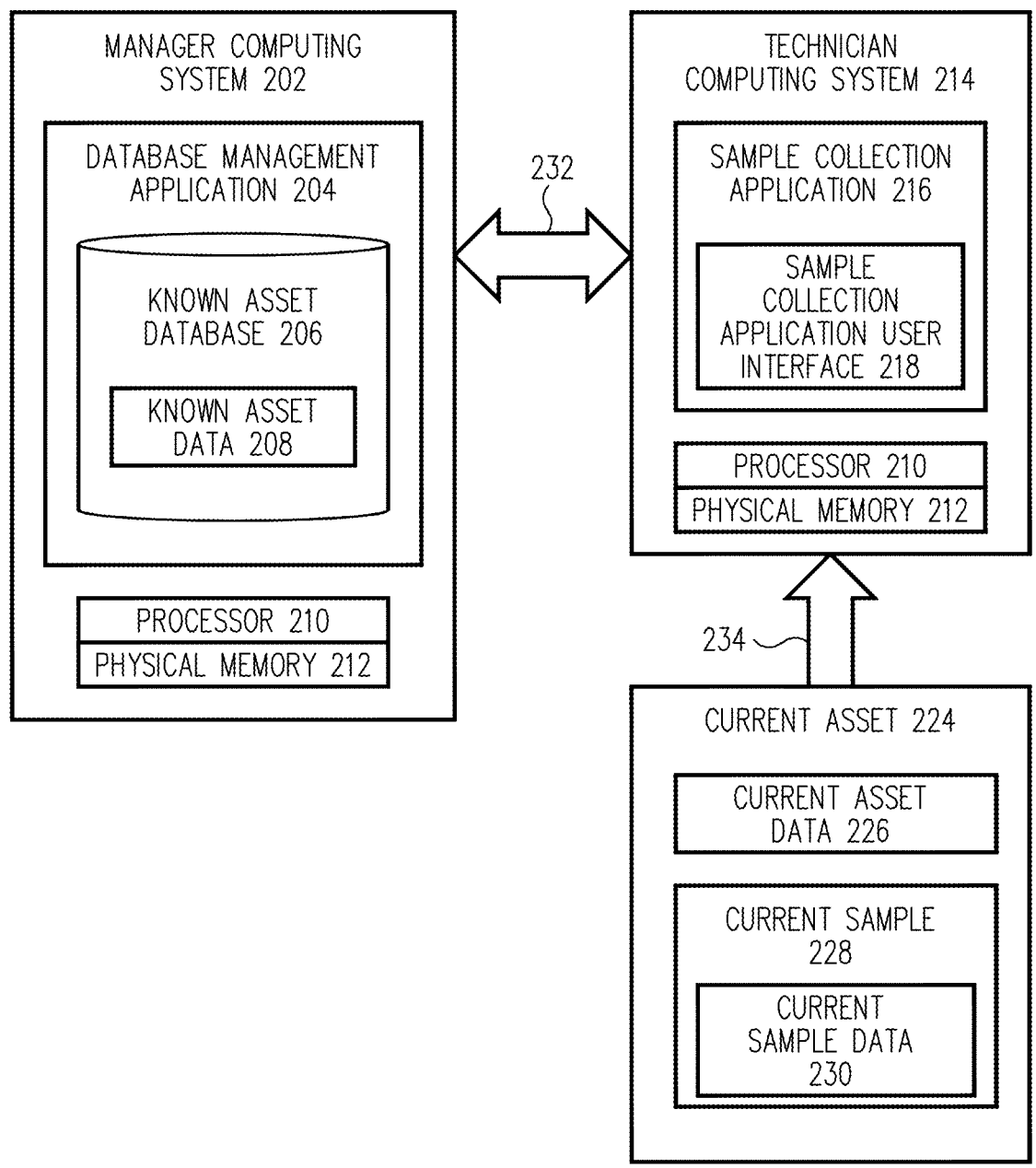
FIG. 2A is a high-level block diagram of a production environment for acquiring, tracking, and testing sample data in accordance with one embodiment.

FIG. 2A is a high level block diagram of a production environment 200A for acquiring, tracking, and testing sample data in accordance with one embodiment.

In one embodiment, production environment 200A includes manager computing system 202. Manager computing system 202 includes an instance of database management application 204, which may be run on manager computing system 202. Database management application 204 includes known asset database 206. Known asset database 206 contains known asset data 208.

In one embodiment production environment 200A also includes technician computing system 214. Technician computing system 214 includes an instance of sample collection application 216, which may be run on technician computing system 214. Sample collection application 216 includes sample collection application user interface 218. Both manager computing system 202 and technician computing system 214 include one or more processors 210 and one or more physical memories 212, which coordinate the operation and interaction of the data and data processing modules associated with database management application 204 and sample collection application 216.

In one embodiment, production environment 200A further includes current asset 224. Current asset data 226 is data associated with current asset 224. Current asset 224 contains current sample 228. Current sample data 230 is data associated with current sample 228. As noted above, in some embodiments a physical sample may be a byproduct and/or spent material from one or more assets. In one embodiment byproducts and/or spent materials from assets may be stored in a vessel or container that is located externally to the asset itself and the technician may collect the physical sample from the vessel or container.

In one embodiment, manager computing system 202 and/or database management application 204 may be communicatively coupled to technician computing system 214 and/or sample collection application 216 through one or more communication networks 232. In various embodiments, communications networks 232 may include one or more wired and/or wireless communications networks, such as, but not limited to, communications networks utilizing technologies such as, but not limited to Bluetooth™ technologies, and/or any other type of communications networks or mechanisms currently known to those of skill in the art, or any other type of communications networks or mechanisms that may be developed after the time of filing. In one embodiment, current asset data 226, current sample 228, and current sample data 230 may be retrieved by a technician operating technician computing system 214 through one or more retrieval mechanisms 234, which in some embodiments may include either physical sample retrieval or electronic, wired, or wireless data sample retrieval.

Embodiments of the present disclosure provide an effective and efficient technical solution to the technical problem of maintaining asset functionality through the acquisition, tracking, and testing of sample data. In the disclosed embodiments, asset data is obtained for assets associated with a manager through database management application 204, which may be run on manager computing system 202. The asset data for assets associated with the manager is stored as known asset data 208 in known asset database 206. The known asset database 206 enables tracking and maintenance of the assets associated with the manager.

In one embodiment, a technician who has been associated, through database management application 204, with one or more assets in the known asset database 206, is provided with sample collection application user interface 218 through sample collection application 216, which may be run on technician computing system 214. Sample collection application user interface 218, allows the technician to obtain current asset data 226 and current sample data 230 from current asset 224 and current sample 228, through one or more retrieval mechanisms 234. The current sample data 230 is then correlated with the current asset data 226. In one embodiment, once the current sample data 230 has been correlated with the current asset data 226, the technician is presented with sample collection application user interface 218 through sample collection application 216, which allows the technician to place one or more requests for tests to be performed on the current sample 228. Once the one or more tests have been performed, test results data is provided through the database management application 204 and/or the sample collection application 216.

Figure 2B:
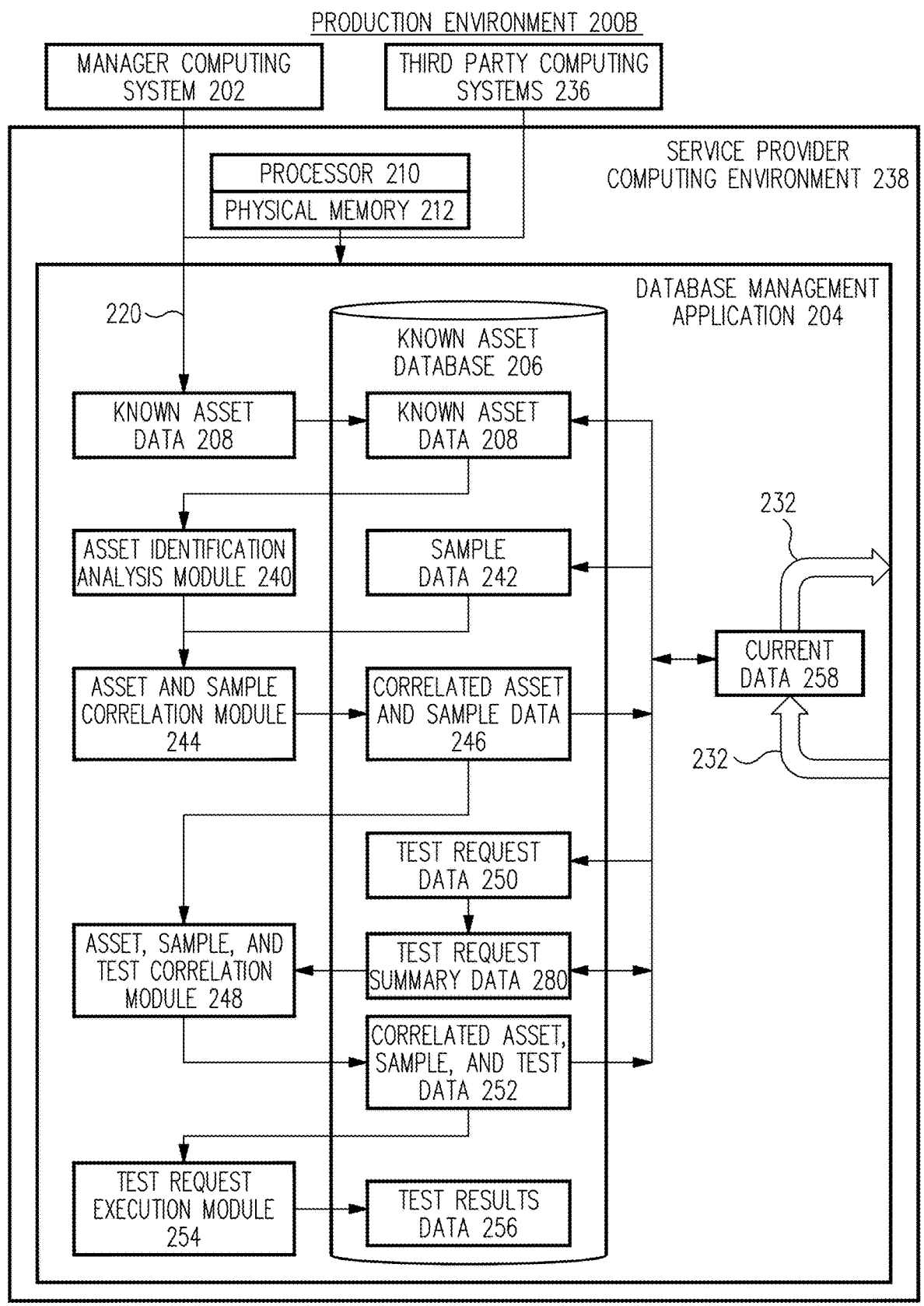
FIG. 2B is a block diagram of a production environment, which provides a more detailed view of the operation of the database management application, in accordance with one embodiment.

FIG. 2B is a block diagram of a production environment 200B, which provides a more detailed view of the operation of database management application 204, in accordance with one embodiment.

In one embodiment, production environment 200B includes manager computing system 202, third party computing systems 236, and service provider computing environment 238. Service provider computing environment 238 further includes database management application 204, and one or more processors 210 and physical memories 212, which coordinate the operation and interaction of the data and data processing modules associated with database management application 204. Manager computing system 202, third party computing systems 236, and service provider computing environment 238 are communicatively coupled with one or more communication networks 220.

In one embodiment, database management application 204 includes asset identification analysis module 240, asset and sample correlation module 244, asset, sample, and test correlation module 248, and test request execution module 254, each of which will be discussed in further detail below.

Additionally, in one embodiment, database management application 204 includes known asset data 208, sample data 242, correlated asset and sample data 246, test request data 250, test request summary data 280, correlated asset, sample, and test data 252, and test results data 256, each of which will be discussed in further detail below. In some embodiments, known asset data 208, sample data 242, correlated asset and sample data 246, test request data 250, test request summary data 280, correlated asset, sample, and test data 252, and test results data 256 may be stored in known asset database 206, which includes data associated with one or more assets managed by a manager. In one embodiment, database management application 204 also includes current data 258, which will also be discussed in further detail below. In one embodiment, current data 258 includes data generated from correlation modules 244 and 248 of database management application 204, such as correlated asset and sample data 246, test request summary data 280, and correlated asset, sample, and test data 252.

Referring now to FIG. 2A and FIG. 2B together, in one embodiment, manager computing system 202 and/or database management application 204 may be communicatively coupled to technician computing system 214 and/or sample collection application 216 through one or more communication networks 232, which allows for transfer of current data 258 to or from database management application 204.

Figure 2C:
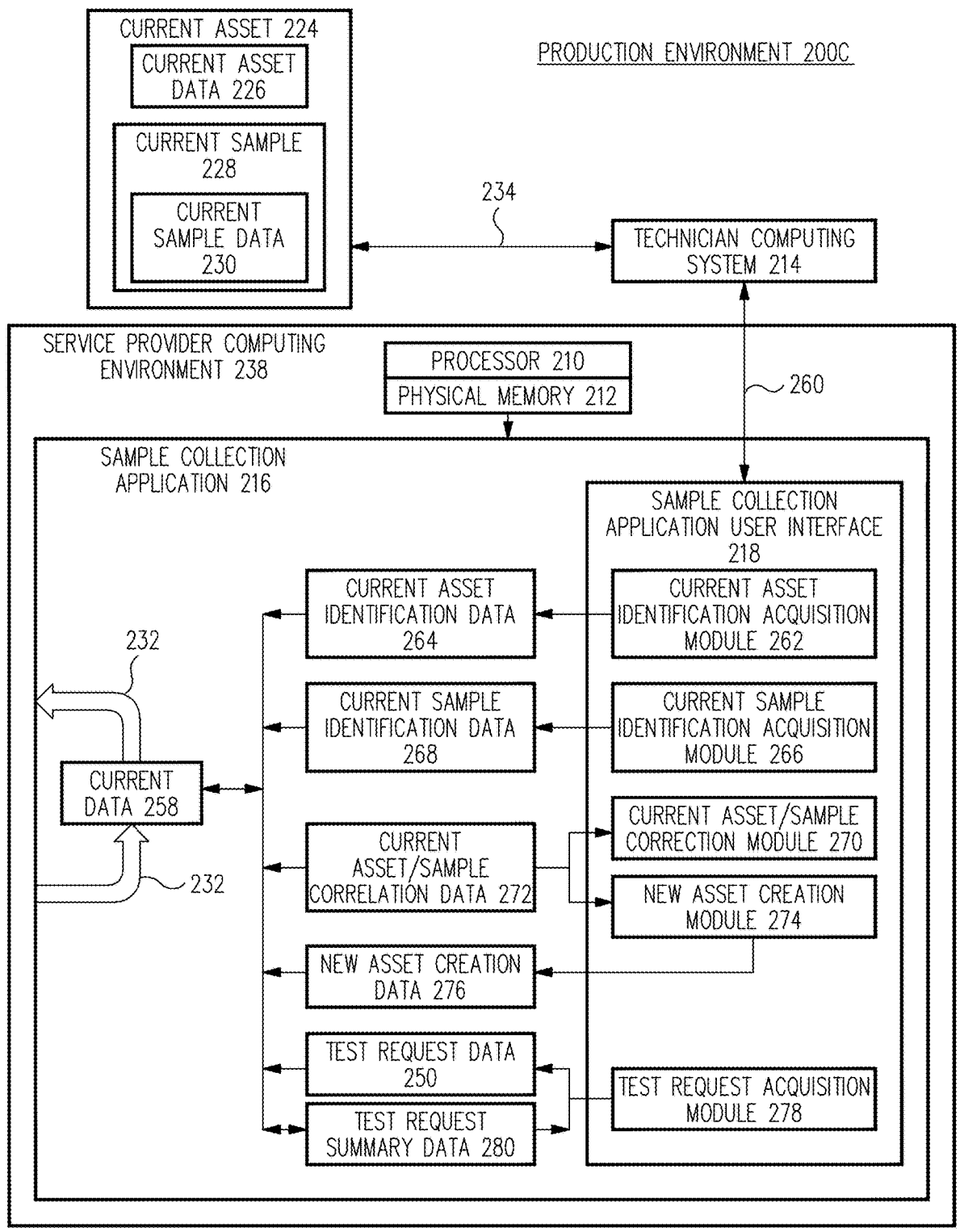
FIG. 2C is a block diagram of a production environment, which provides a more detailed view of the operation of the sample collection application, in accordance with one embodiment.

FIG. 2C is a block diagram of a production environment 200C, which provides a more detailed view of the operation of sample collection application 216, in accordance with one embodiment.

In one embodiment, production environment 200C includes current asset 224, current asset data 226, current sample 228, and current sample data 230. In one embodiment, production environment 200C also includes technician computing system 214 and service provider computing environment 238. Current asset data 226, current sample 228, and current sample data 230 may be retrieved by a technician operating technician computing system 214 through one or more retrieval mechanisms 234. Service provider computing environment 238 further includes sample collection application 216, and one or more processors 210 and physical memories 212, which coordinate the operation and interaction of the data and data processing modules associated with sample collection application 216. Technician computing system 214 and service provider computing environment 238 are communicatively coupled by one or more communication networks 260.

In one embodiment, sample collection application 216 includes sample collection application user interface 218, which further includes current asset identification acquisition module 262, current sample identification acquisition module 266, current asset/sample correction module 270, new asset creation module 274, and test request acquisition module 278, each of which will be discussed in further detail below.

Additionally, in one embodiment, sample collection application 216 includes current asset identification data 264, current sample identification data 268, current asset/sample correlation data 272, new asset creation data 276, test request data 250, test request summary data 280, and current data 258, each of which will be discussed in further detail below. In one embodiment, current data 258 includes data generated through modules 262, 266, 270, 274, and 278 of sample collection application user interface 218, such as current asset identification data 264, current sample identification data 268, new asset creation data 276, test request data 250, and test request summary data 280.

Referring now to FIG. 2B and 2C together, in one embodiment, technician computing system 214 and/or sample collection application 216 may be communicatively coupled to manager computing system 202 and/or database management application 204 through one or more communication networks 232, which allows for transfer of current data 258 from or to sample collection application 216.

In various embodiments, communications networks 232 allow a manager associated with manager computing system 202, in control of database management application 204, to communicate with a technician associated with technician computing system 214, in control of sample collection application 216. Consequently, communications networks 232 allow both the manager and the technician to view data associated with the assets that have been already been sampled, in addition to data associated with assets that still require sampling. In some embodiments, a manager can assign and direct a technician on what to sample through database management application 204 to sample collection application 216 via communications networks 232.

Referring now to FIG. 2B, and the discussion above with respect to FIG. 1, in one embodiment a manager is provided with access to database management application 204 through the manager computing system 202. As discussed above, and as used herein, the term "manager" may refer to an owner of one or more assets, a manager of one or more assets, a decision-maker responsible for assessing the status of an asset, a technician responsible for servicing one or more assets, and/or any other asset service provider. In various embodiments, database management application 204 may be any type of application that is capable of providing and receiving information to/from manager computing system 202 through a user interface. In one embodiment, once a manager associated with manager computing system 202 is provided with access to database management application 204, known asset data 208, which is data associated with known assets managed by the manager associated with manager computing system 202, is obtained and stored as known asset data 208 in known asset database 206. In various embodiments, database management application 204 may obtain data associated with the manager of manager computing system 202 in addition to obtaining known asset data 208.

In some embodiments, in addition to, or instead of, known asset data 208 being obtained directly from the manager associated with manager computing system 202, known asset data 208 may be obtained from one or more third party computing systems 236. In one embodiment, once known asset data 208 is obtained from one or more managers and stored in known asset database 206, a technician associated with an asset in the known asset database 206 is provided with one or more user interfaces through a sample collection application.

Referring now to FIG. 2C, and the discussion above with respect to FIG. 1, a technician associated with technician computing system 214 may access sample collection application 216 through sample collection application user interface 218. As already discussed above, and as used herein, the term "technician" may refer to an owner, manager, technician or other service provider who is responsible for collecting physical or other types of sample data using the sample collection application 216 on technician computing system 214.

In one embodiment, sample collection application 216 may be any type of application that is capable of providing and receiving information to/from technician computing system 214 through sample collection application user interface 218.

In one embodiment, once the technician associated with technician computing system 214 is provided with sample collection application user interface 218, the technician may be prompted to enter authentication credentials in order to proceed. Once the technician has provided their authentication credentials, current sample identification data 268 is obtained through current sample identification acquisition module 266, which is provided to technician computing system 214 through sample collection application user interface 218. The current sample identification data 268 is retrieved through the one or more retrieval mechanisms 234 from current sample data 230, and identifies current sample 228, which has also been obtained by the technician through the one or more retrieval mechanisms 234.

In one embodiment, once current sample identification data 268 has been obtained from current sample data 230 by current sample identification acquisition module 266 of sample collection application user interface 218, current asset identification data 264 is obtained through current asset identification acquisition module 262, which is provided to the technician computing system 214 through sample collection application user interface 218. The current asset identification data 264 is retrieved through the one or more retrieval mechanisms 234 from current asset data 226, and identifies the current asset 224 associated with the current sample 228 obtained by the technician.

In one embodiment, geolocation data may be utilized to identify current asset 224 based on assets known to be located near the geolocation of the technician. In one embodiment, the current asset 224 may be identified using the technician's geolocation data without any direct input from the technician.

Referring now to FIG. 2B and FIG. 2C together, and the discussion above with respect to FIG. 1, in one embodiment, once current asset identification data 264 has been obtained from current asset data 226 by current asset identification acquisition module 262 of sample collection application user interface 218, the current sample identification data 268 and the current asset identification data 264 are stored as part of current data 258, which will be sent to database management application 204 over the one or more communication networks 232. Once current data 258 is received by database management application 204, asset identification analysis module 240 compares current data 258 to the known asset data 208 to determine whether the current asset 224 identified by the current asset identification data 264 exists in the known asset database 206.

In one embodiment, analysis of the current asset identification data 264 is performed by asset identification analysis module 240 by comparing the current asset identification data 264 to the known asset data 208 that is stored in the portion of the known asset database 206 associated with the technician. In one embodiment, the analysis of the current asset identification data 264 by asset identification analysis module 240 can indicate at least two different outcomes. One outcome is that a match was found between the current asset identification data 264 and an asset identified in the known asset data 208 that is stored in the portion of the known asset database 206 that is associated with the technician, and so the asset identification analysis module 240 arrives at a determination that the current asset 224 already exists in the portion of the known asset database 206 associated with the technician. Another outcome is that no match was found between the current asset identification data 264 and any assets identified in the known asset data 208 of known asset database 206, and so the asset identification analysis module 240 arrives at a determination that either some type of error occurred, or that the current asset 224 has not yet been created and/or associated with the technician operating technician computing system 214 in the known asset database 206.

In one embodiment, once the current asset identification data 264 has been analyzed, appropriate action is taken depending on whether the outcome of the asset identification analysis module 240 indicated that the current asset 224 exists in the known asset database 206, or indicated that the current asset 224 does not exist in the known asset database 206.

In one embodiment, if the outcome of asset identification analysis module 240 indicates that the current asset 224 does not exist in the known asset database 206, this data may be passed through current data 258 over communication networks 232 to provide technician computing system 214 with a notification message through the sample collection application user interface 218. Upon receiving the notification message, the technician may determine that an error occurred in entering the current asset identification data 264, and the technician may simply attempt to rescan or retype the current asset barcode and/or serial number through current asset/sample correction module 270 of sample collection application user interface 218.

In one embodiment, if the outcome of asset identification analysis module 240 indicates that the current asset 224 does not exist in the known asset database 206, then the technician may be presented with an option to create a new asset through new asset creation module 274 of sample collection application user interface 218. New asset creation module 274 obtains new asset creation data 276 to create a new known asset, which is represented by new asset creation data 276, and is initially stored in current data 258. Current data 258 is then transmitted over communication networks 232, received by database management application 204, and stored in the portion of known asset database 206 that is associated with the technician operating technician computing system 214.

In one embodiment, upon a determination that the current asset 224 already exists in the portion of the known asset database 206 associated with the technician computing system 214, or upon creation of new known asset data 208 through new asset creation module 274, the current sample identification data 268 previously obtained is correlated with the current asset identification data 264 either previously obtained by current asset identification acquisition module 262, or newly created through new asset creation module 274.

Returning now to FIGS. 2B and 2C together, in one embodiment, the asset-sample correlation process performed by asset and sample correlation module 244 of FIG. 2B includes forming an association between current asset identification data 264 and current sample identification data 268, retrieved from current data 258, which results in the generation of correlated asset and sample data 246, and may then be stored as part of known asset database 206 and/or current data 258.

In one embodiment, once current sample identification data 268 is correlated with current asset identification data 264, resulting in correlated asset and sample data 246, test request acquisition module 278 of FIG. 2C requests test request data 250 from the technician associated with technician computing system 214. In various embodiments, the test request data 250 is obtained through a test selection user interface, which is presented to a technician associated with technician computing system 214, through the sample collection application user interface 218 of the sample collection application 216.

In one embodiment, upon submission of test request data 250 to the known asset database 206 through current data 258 over one or more communications networks 232, test request data 250 is processed to generate test request summary data 280, which is then provided to technician computing system 214 through current data 258 over the one or more communications networks 232. Test request summary data 280 summarizes the options and instructions for the one or more tests to be performed on the current sample 228 represented by the current sample identification data 268. In various embodiments, the test request summary data 280 may include the current asset identification data 264, current sample identification data 268, a preview of the test options that were selected in test request data 250, pricing information and/or any other information regarding the one or more test requests that the technician or other party may wish to review.

In one embodiment, upon confirmation by the technician of the test request summary data 280, the current sample identification data 268 and the current asset identification data 264 are correlated with the test request summary data 280, resulting in correlated asset, sample, and test data 252, stored in the known asset database 206 of FIG. 2B.

In one embodiment, once the current sample identification data 268 and the current asset identification data 264 have been correlated with the test request summary data 280, after the technician has submitted test request data 250 for the current sample 228 through test request acquisition module 278 of the sample collection application 216, the technician may be prompted through the sample collection application user interface 218 to indicate whether they would like to repeat the process for an additional sample.

In one embodiment, upon a determination that the technician would not like to process an additional sample, correlated asset, sample, and test data 252 is submitted for processing by test request execution module 254. In one embodiment, once the technician associated with technician computing system 214 has confirmed the test request summary data 280 electronically through the test request acquisition module 278 of sample collection application user interface 218, the technician may also need to deposit one or more associated samples to a testing service provider for processing.

Once the testing service provider receives current sample 228, the testing service provider may access the test request summary data 280 and/or the correlated asset, sample, and test data 252 associated with the current sample 228 from known asset database 206 through database management application 204, and the asset testing service provider may proceed to perform the one or more tests indicated by test request summary data 280. Once the one or more tests indicated by test request summary data 280 have been performed, test results data 256 representing the results of the performed tests may then be stored in known asset database 206, or otherwise provided through database management application 204 and/or sample collection application 216. The test results data 256 may then be reviewed through database management application 204 or sample collection application 216 by any parties associated with the asset corresponding to the test results data 256, such as the owner, one or more managers, one or more decision-makers, one or more technicians, and one or more service providers.

The embodiments disclosed herein provide an effective and efficient technical solution to the technical problem of maintaining asset functionality through the acquisition, tracking, and testing of sample data. The embodiments disclosed herein are not an abstract idea, and are well-suited to a wide variety of practical applications. Further, many of the embodiments disclosed herein require processing and analysis of large numbers of assets, physical samples, tests, and many combinations thereof. Thus, the technical solution disclosed herein cannot be implemented solely by mental steps or pen and paper, is not an abstract idea, and is, in fact, directed to providing technical solutions to long-standing technical problems associated with maintaining asset functionality through the acquisition, tracking, and testing of sample data.

Additionally, the disclosed method and system for acquisition, tracking, and testing of sample data requires a specific process comprising the aggregation and detailed analysis of large quantities of asset, sample, and test data, and as such, does not encompass, embody, or preclude other forms of innovation in the area of asset maintenance. Further, the disclosed embodiments of systems and methods for acquisition, tracking, and testing of sample data are not abstract ideas for at least several reasons.

First, effectively and efficiently acquiring, tracking, and testing sample data is not an abstract idea because it is not merely an idea in and of itself. For example, the process cannot be performed mentally or using pen and paper, as it is not possible for the human mind to identify, process, and analyze all possible combinations of assets, samples, and testing data, even with pen and paper to assist the human mind and even with unlimited time.

Second, effectively and efficiently acquiring, tracking, and testing sample data is not a fundamental economic practice (e.g., is not merely creating a contractual relationship, hedging, mitigating a settlement risk, etc.).

Third, effectively and efficiently acquiring, tracking, and testing sample data is not merely a method of organizing human activity (e.g., managing a game of bingo). Rather, in the disclosed embodiments, the method and system for effectively and efficiently acquiring, tracking, and testing sample data provides a tool that significantly improves the field of asset maintenance. Through the disclosed embodiments, managers and/or technicians are provided with a method and system for effectively and efficiently acquiring, tracking, and testing sample data, which reduces the burden placed on the technicians performing this task and further reduces instances of incorrect or missing data, thus ensuring that the assets continue to operate safely and effectively. As such, the method and system disclosed herein is not an abstract idea, and also serves to integrate the ideas disclosed herein into practical applications of those ideas.

Fourth, although mathematics may be used to implement the embodiments disclosed herein, the systems and methods disclosed and claimed herein are not abstract ideas because the disclosed systems and methods are not simply a mathematical relationship/formula.

It should be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

The invention claimed is:

1. A computing system implemented method comprising:
storing known asset data associated with one or more operational assets in a known asset database accessible by a sample collection application;
providing a technician with access to the sample collection application through a user interface of a physical sample identification collection device;
collecting, by the technician, a physical sample from a current operational asset wherein the physical sample is collected from the current operational asset at the location of the current operational asset;
processing the physical sample during collection of the physical sample by the technician, wherein processing the physical sample includes:
utilizing one or more optical components of the sample identification collection device to obtain, by the technician, at the location of the current operational asset, sample identification data identifying the physical sample collected by the technician from the current operational asset;
utilizing the one or more optical components of the sample identification collection device to obtain, by the technician, at the location of the current operational asset, current asset identification data identifying the current operational asset from which the technician collected the physical sample;

utilizing the sample identification collection device and the current asset identification data to locate a known asset in the known asset database that matches the current operational asset;

correlating, by one or more processors of the sample identification collection device, the sample identification data with the known asset that matches the current operational asset to generate correlated asset and sample data;

storing, by one or more processors of the sample identification collection device, the correlated asset and sample data in the known asset database;

utilizing the sample identification collection device to obtain test request data from the technician, at the location of the current operational asset, the test request data representing requests for one or more tests to be run on the physical sample, wherein the one or more tests to be run provide an indication of the operational performance of the known asset that matches the current operational asset;

correlating, by one or more processors of the sample identification collection device, the test request data with the correlated asset and sample data to generate correlated asset, sample, and test data;

storing, by one or more processors of the sample identification collection device, the correlated asset, sample, and test data in the known asset database; and utilizing the sample identification collection device to provide a testing service provider with access to the correlated asset, sample, and test data stored in the known asset database;

depositing the physical sample for processing by the testing service provider;

performing, by the testing service provider, the one or more tests on the physical sample;

receiving test results data from the testing service provider representing the results of the one or more tests run on the physical sample; and displaying the test results data to an individual responsible for monitoring the current operational asset.

2. The computing system implemented method of claim 1 wherein the known asset and current operational asset are assets selected from the group of assets consisting of:
transformers;
generators;
voltage regulators;
wind turbines; solar farm equipment;
gas vehicles; electric vehicles;
electrical equipment;
gas-filled breakers;
oil-filled breakers;
dry breakers;
air breakers;
storage tanks;
vehicle equipment;
mining equipment;
hauling equipment;
farming equipment;
aviation equipment;
oil and gas equipment;
shipboard and marine equipment;
equipment engines; and
equipment motors.

3. The computing system implemented method of claim 1 wherein the physical sample is a sample selected from the group of physical samples consisting of:
fluid samples;
gas samples; and
solid samples.

4. The computing system implemented method of claim 1 wherein sample collection also includes collecting inspection report data.

5. The computing system implemented method of claim 1 wherein obtaining current asset identification data identifying the current operational asset includes one or more of:
obtaining current asset textual data identifying the current operational asset through the user interface of the sample identification collection device;
utilizing the one or more optical components of the sample identification collection device to obtain current asset nameplate image data representing an image of an asset nameplate;
utilizing the one or more optical components of the sample identification collection device to obtain current asset image data representing an image of the current operational asset;
utilizing the one or more optical components of the sample identification collection device to obtain current asset identification image data representing an image of the identification data on the current operational asset;
utilizing the one or more optical components of the sample identification collection device to obtain current asset barcode image data representing an image of a current asset barcode associated with the current operational asset; and
utilizing the one or more optical components of the sample identification collection device to obtain current asset barcode data representing data generated by scanning a current asset barcode associated with the current operational asset.

6. The computing system implemented method of claim 1 wherein obtaining sample identification data identifying a physical sample includes one or more of:
obtaining current sample textual data identifying the current sample through the user interface of the sample identification collection device;
utilizing the one or more optical components of the sample identification collection device to obtain sample image data representing an image of the physical sample;
utilizing the one or more optical components of the sample identification collection device to obtain sample identification image data representing an image of the identification data on the physical sample;
utilizing the one or more optical components of the sample identification collection device to obtain sample barcode image data representing an image of a sample barcode associated with the physical sample; and
utilizing the one or more optical components of the sample identification collection device to obtain sample barcode data representing data generated by scanning a sample barcode associated with the physical sample.

7. The computing system implemented method of claim 1 further including: analyzing the current asset identification data and the known asset data to determine whether the current operational asset exists in the known asset database.

8. The computing system implemented method of claim 7 wherein analyzing the current asset identification data and the known asset data to determine whether the current operational asset exists in the known asset database includes comparing the current asset identification data with the known asset data from the known asset database to identify one or more assets that match the asset identification data using one or more Optical Character Recognition systems.

9. The computing system implemented method of claim 7 further including:
   upon a determination that the current operational asset does not exist in the known asset database, requesting the current asset identification data be checked and re-submitted through the user interface of the sample identification collection device; and
   upon a determination that the current operational asset does not exist in the known asset database after receiving the requested checked and re-submitted current asset identification data, requesting new asset creation data through a new asset creation user interface of the sample identification collection device, the new asset creation data being used to create a new known asset.

10. The computing system implemented method of claim 9 wherein creating the new known asset includes obtaining new asset creation data that includes the current asset identification data and storing the new asset creation data in the known asset database.

11. The computing system implemented method of claim 1 wherein utilizing the sample identification collection device to obtain test request data includes:
   analyzing the known asset data for the current operational asset associated with the physical sample to determine one or more tests that are available to be performed on the physical sample;
   providing the technician with a list of the one or more tests that are available to be performed on the physical sample through a test request user interface of the sample identification collection device;
   obtaining test request data through the test request user interface of the sample identification collection device, the test request data representing one or more tests selected to be run on the physical sample represented by the sample identification data;
   providing, through the user interface of the sample identification collection device, test request summary data; and
   upon confirmation of the test request summary data, correlating the sample identification data and the known asset data associated with the current operational asset with the test request summary data.

12. The computing system implemented method of claim 1 further comprising:
   obtaining geolocation data representing the geolocation of the technician;
   determining known assets near the geolocation of the technician;
   providing the technician, through the user interface of the sample identification collection device, with a listing of the determined known assets near the geolocation of the technician; and
   obtaining the current asset identification data identifying an asset from which a physical sample is to be collected by the technician, by the technician selecting one of the determined known assets near the geolocation of the technician listed in the listing of the determined known assets near the geolocation of the technician.

13. The computing system implemented method of claim 12 wherein the geolocation data for the technician is obtained from the sample identification collection device.

14. The computing system implemented method of claim 1 further comprising:
   obtaining geolocation data representing the geolocation of the technician;
   determining a known asset near the geolocation of the technician; and
   obtaining the current asset identification data identifying an asset from which a physical sample is to be collected by the technician, by accessing the known asset identification data associated with the known asset near the geolocation of the technician.

15. The computing system implemented method of claim 14 wherein the geolocation data for the technician is obtained from the sample identification collection device.

16. A system comprising:
   one or more known assets;
   a known asset database accessible by a sample collection application, the known asset database including known asset data associated with the one or more known assets;
   a sample collection application, access to the sample collection application being provided to one or more technicians, through a user interface of a physical sample identification collection device;
   a current operational asset, the current operational asset being an asset from which a current sample is to be obtained by a technician;
   at least one processor; and
   at least one memory coupled to the at least one processor, the at least one memory having stored therein instructions which when executed by any set of the at least one processor, perform a process, the process including:
      collecting, by the technician, a physical sample from the current operational asset, wherein the physical sample is collected from the current operational asset at the location of the current operational asset;
      utilizing one or more optical components of the sample identification collection device to obtain, by the technician, at the location of the current operational asset, sample identification data identifying the physical sample collected by the technician from the current operational asset;
      utilizing the one or more optical components of the sample identification collection device to obtain, by the technician, at the location of the current operational asset, current asset identification data identifying the current operational asset from which the technician collected the physical sample;
      utilizing the sample identification collection device and the current asset identification data to locate a known asset in the known asset database that matches the current operational asset;
      correlating, by one or more processors of the sample identification collection device, the sample identification data with the known asset that matches the current operational asset to generated correlated asset and sample data;
      storing, by one or more processors of the sample identification collection device, the correlated asset and sample data in the known asset database;
      utilizing the sample identification collection device to obtain test request data from the technician, at the location of the current operational asset, the test request data representing requests for one or more tests to be run on the physical sample, wherein the one or more tests to be run provide an indication of the operational performance of the known asset that matches the current operational asset; and utilizing the sample identification collection device to provide a testing service provider with access to the correlated asset, sample, and test data stored in the known asset database;

depositing the physical sample for processing by the testing service provider;

performing, by the testing service provider, the one or more tests on the physical sample;

receiving test results data from the testing service provider representing the results of the one or more tests run on the physical sample; and displaying the test results data to an individual responsible for monitoring the current operational asset.

17. The system of claim 16 wherein the known assets and current operational asset are assets selected from the group of assets consisting of:
   transformers;
   generators;
   voltage regulators;
   wind turbines;
   solar farm equipment;
   gas vehicles;
   electric vehicles;
   electrical equipment;
   gas-filled breakers;
   oil-filled breakers;
   dry breakers;
   air breakers;
   storage tanks;
   vehicle equipment;
   mining equipment;
   hauling equipment;
   farming equipment;
   aviation equipment;
   oil and gas equipment;
   shipboard and marine equipment;
   equipment engines; and
   equipment motors.

18. The system of claim 16 wherein the physical sample is a sample selected from the group of physical samples consisting of:
   fluid samples;
   gas samples; and
   solid samples.

19. The system of claim 16 wherein sample collection also includes collecting inspection report data.

20. The system of claim 16 wherein obtaining current asset identification data identifying a current operational asset includes one or more of:
   obtaining current asset textual data identifying the current operational asset through the user interface of the sample identification collection device;
   utilizing the one or more optical components of the sample identification collection device to obtain current asset nameplate image data representing an image of an asset nameplate;
   utilizing the one or more optical components of the sample identification collection device to obtain current asset image data representing an image of the current operational asset;
   utilizing the one or more optical components of the sample identification collection device to obtain current asset identification image data representing an image of the identification data on the current operational asset;
   utilizing the one or more optical components of the sample identification collection device to obtain current asset barcode image data representing an image of a current asset barcode associated with the current operational asset; and
   utilizing the one or more optical components of the sample identification collection device to obtain current asset barcode data representing data generated by scanning a current asset barcode associated with the current operational asset.

21. The system of claim 16 wherein obtaining sample identification data identifying a physical sample includes one or more of:
   obtaining current sample textual data identifying the current sample through the user interface of the sample identification collection device;
   utilizing the one or more optical components of the sample identification collection device to obtain sample image data representing an image of the physical;
   utilizing the one or more optical components of the sample identification collection device to obtain sample identification image data representing an image of the identification data on the physical sample;
   utilizing the one or more optical components of the sample identification collection device to obtain sample barcode image data representing an image of a sample barcode associated with the physical sample; and
   utilizing the one or more optical components of the sample identification collection device to obtain sample barcode data representing data generated by scanning a sample barcode associated with the physical sample.

22. The system of claim 16 further including:
   analyzing the current asset identification data and the known asset data to determine whether the current operational asset exists in the known asset database.

23. The system of claim 22 wherein analyzing the current asset identification data and the known asset data to determine whether the current operational asset exists in the known asset database includes comparing the current asset identification data with the known asset data from the known asset database to identify one or more assets that match the asset identification data using one or more Optical Character Recognition systems.

24. The system of claim 22 further including:
   upon a determination that the current operational asset does not exist in the known asset database, requesting the current asset identification data be checked and re-submitted through the user interface of the sample identification collection device; and
   upon a determination that the current operational asset does not exist in the known asset database after receiving the requested checked and re-submitted current asset identification data, requesting new asset creation data through a new asset creation user interface of the sample identification collection device, the new asset creation data being used to create a new known asset.

25. The system of claim 24 wherein creating the new known asset includes obtaining new asset creation data that includes the current operational asset identification data and storing the new asset creation data in the known asset database.

26. The system of claim 16 wherein utilizing the sample identification collection device to obtain test request data includes:
   analyzing the known asset data for the current operational asset associated with the physical sample to determine one or more tests that are available to be performed on the physical sample;

providing the technician with a list of the one or more tests that are available to be performed on the physical sample through a test request user interface of the sample identification collection device;

obtaining test request data through the test request user interface of the sample identification collection device, the test request data representing one or more tests selected to be run on the physical sample represented by the sample identification data;

providing, through the user interface of the sample identification collection device, test request summary data; and upon confirmation of the test request summary data, correlating the sample identification data and the known asset data associated with the current operational asset with the test request summary data.

27. The system of claim 16 further comprising:
obtaining geolocation data representing the geolocation of the technician;
determining known assets near the geolocation of the technician;
providing the technician, through the user interface of the sample identification collection device, with a listing of the determined known assets near the geolocation of the technician; and
obtaining the current asset identification data identifying an asset from which a physical sample is to be collected by the technician, by the technician selecting one of the determined known assets near the geolocation of the technician listed in the listing of the determined known assets near the geolocation of the technician.

28. The system of claim 27 wherein the geolocation data for the technician is obtained from the sample identification collection device.

29. The system of claim 16 further comprising:
obtaining geolocation data representing the geolocation of the technician;
determining a known asset near the geolocation of the technician; and
obtaining the current asset identification data identifying an asset from which a physical sample is to be collected by the technician, by accessing the known asset identification data associated with the known asset near the geolocation of the technician.

30. The system of claim 29 wherein the geolocation data for the technician is obtained from the sample identification collection device.

* * * * *